US009516242B2

(12) United States Patent
Kerwien et al.

(10) Patent No.: US 9,516,242 B2
(45) Date of Patent: Dec. 6, 2016

(54) METHOD AND APPARATUS FOR IMAGE RECONSTRUCTION

(71) Applicant: Carl Zeiss AG, Oberkochen (DE)

(72) Inventors: Norbert Kerwien, Mögglingen (DE); Michael Kieweg, Heidenheim an der Benz (DE)

(73) Assignee: Carl Zeiss AG, Oberkochen (DE)

( * ) Notice: Subject to any disclaimer, the term of this patent is extended or adjusted under 35 U.S.C. 154(b) by 37 days.

(21) Appl. No.: 14/415,750

(22) PCT Filed: Jul. 18, 2013

(86) PCT No.: PCT/EP2013/065196
§ 371 (c)(1),
(2) Date: Jan. 20, 2015

(87) PCT Pub. No.: WO2014/013021
PCT Pub. Date: Jan. 23, 2014

(65) Prior Publication Data
US 2015/0181131 A1 Jun. 25, 2015

(30) Foreign Application Priority Data
Jul. 20, 2012 (DE) .................. 10 2012 106 584

(51) Int. Cl.
H04N 5/262 (2006.01)
H04N 5/225 (2006.01)
(Continued)

(52) U.S. Cl.
CPC ............. H04N 5/262 (2013.01); G06T 5/50 (2013.01); H04N 5/265 (2013.01); G06K 2009/2045 (2013.01); G06T 2207/10004 (2013.01); G06T 2207/20221 (2013.01); H04N 1/56 (2013.01); H04N 5/2258 (2013.01)

(58) Field of Classification Search
None
See application file for complete search history.

(56) References Cited

U.S. PATENT DOCUMENTS 6,977,676 B1 12/2005 Sato et al.
7,436,518 B1 10/2008 Smith et al.
(Continued)

FOREIGN PATENT DOCUMENTS

DE 102004051969 5/2006
WO 2005031645 4/2005
(Continued)

OTHER PUBLICATIONS

J.-H. Lee, Y.-S. Ho. Non-blind image doconvolution with adaptive regularization. Advances in Multimedia Information Processing—PCM 2010, Lecture Notes in Computer Science, 2010, vol. 6297/2010, pp. 719-730, Springer-Verlag Berlin Heidelberg 2010.

Primary Examiner — Roberto Velez
Assistant Examiner — Quan Pham
(74) Attorney, Agent, or Firm — Sand & Sebolt

(57) ABSTRACT

An apparatus for image reconstruction comprises an optical system and a control means for controlling the optical system, which control means is configured to control the optical system, for the capture of a plurality of single images, in such a manner that at least one parameter of the optical system is different upon capture of at least two single images. The apparatus comprises a processing device for digitally reconstructing an image in dependence on the plurality of single images and in dependence on information about optical transfer functions of the optical system upon capture of the plurality of single images.

20 Claims, 9 Drawing Sheets

(51) Int. Cl.
  *H04N 5/265* (2006.01)
  *H04N 1/56* (2006.01)
  *G06T 5/50* (2006.01)
  *G06K 9/20* (2006.01)

(56) References Cited

U.S. PATENT DOCUMENTS

| | | |
|---|---|---|
| 2009/0141140 A1 | 6/2009 | Robinson |
| 2009/0245688 A1 | 10/2009 | Robinson |
| 2009/0296205 A1 | 12/2009 | Ouchi |
| 2010/0053411 A1* | 3/2010 | Robinson ............... G02B 26/06 348/335 |
| 2011/0074988 A1 | 3/2011 | Robinson |
| 2011/0164323 A1 | 7/2011 | Liege et al. |
| 2011/0242373 A1* | 10/2011 | Inoue ................... H04N 5/3572 348/242 |
| 2013/0266241 A1* | 10/2013 | Ranalli ..................... G06T 3/40 382/280 |

FOREIGN PATENT DOCUMENTS

| | | |
|---|---|---|
| WO | 2009108050 | 9/2009 |
| WO | 2011139150 | 11/2011 |

* cited by examiner

METHOD AND APPARATUS FOR IMAGE RECONSTRUCTION

BACKGROUND OF THE INVENTION

Technical Field

The invention relates to methods and apparatuses for image reconstruction. The invention relates in particular to methods and apparatuses in which an image is reconstructed mathematically from a plurality of single images showing the same object.

Background Information

Modern optical systems are nowadays to satisfy ever higher demands in terms of image quality. This can be attained by means of high-precision and high-quality lenses (for example in the reflex camera field). In alternative approaches, less expensive lenses are used in combination with subsequent post-processing. The latter approaches are used, for example, in cameras integrated in mobile telephones. Although high-quality lenses exhibit a better image quality, they are substantially more expensive in terms of cost price. However, the approach of using cheaper lenses with subsequent post-processing also has limitations, because with conventional approaches optical aberrations can often be compensated for only with losses in image quality. How effectively optical aberrations can be deconvolved depends substantially on the contrast of the modulation transfer function (MTF) and on the signal-to-noise ratio (SNR) of the image. If at some spatial frequencies the contrast given by the MTF in relation to the SNR is low, those spatial frequencies cannot be reconstructed or can be reconstructed only under certain additional assumptions. This is the case in particular for spatial frequency ranges in which the MTF has zeros due to aberration. Such zeros in the MTF can occur, for example, in the case of astigmatism or defocus.

In addition, wavelength-dependent optical aberrations can also occur with simpler lenses. Examples thereof are transverse chromatic aberrations and longitudinal chromatic aberrations, which cannot be compensated for, or can be compensated for only with difficulty, by conventional approaches to digital post-processing.

The following approaches have conventionally been followed in order to achieve a higher image quality:

Higher-quality lenses can be used. However, as well as having cost disadvantages, this can also lead to a large installation space and high weight. In addition, with a larger number of lenses, the susceptibility of the system to reflection can be increased and/or the transmission can be reduced. This is disadvantageous for many applications in the end user field, but also in the field of expensive special equipment.

Simpler lenses can be used and deconvolution methods can be employed. Optical aberrations caused by less expensive lenses can be determined by simulations or measurements after manufacture and then deconvolved with the aid of known deconvolution methods, for example the Wiener filter. However, aberrations can be compensated for to only a certain degree using such techniques. In particular when the contrasts of the MTF in relation to the noise are small, various image artefacts, for example image noise or so-called ringing artefacts, can form depending on the deconvolution method.

When the sensitivity of an image sensor covers a relatively large wavelength range, the point spread function (PSF), or MTF, can change wavelength-dependently. This is the case, for example, when each of a plurality of color channels of the image sensor covers a relatively large wavelength interval. This makes image reconstruction more difficult, because a convolution with different PSFs takes place wavelength-dependently. A deconvolution can be made, for example, with a polychromatic PSF, with which the variation of the PSF with the wavelength can be taken into consideration at least to a certain degree. However, digital compensation of transverse chromatic aberrations, for example, continues to be possible to only a limited extent. With polychromatic PSFs, it is only possible to compensate for the shift between two color channels with conventional approaches. The transverse chromatic aberrations within the sensitivity range of a color channel that are not compensated for persist at least in part. A limitation to the effect that the PSF for a subsequent image reconstruction is not to change or is to change only slightly within the spectral range of a color channel represents a great limitation for the lens design and requires more expensive and more accurate lenses. In addition, with conventional approaches, a wavelength-resolved reconstruction is possible to only a limited degree and is frequently limited to the number of color channels of the image sensor.

In order to make improvements in respect of the mentioned disadvantages, reconstruction methods can use so-called image priors. This is described, for example, in J.-H. Lee, Y.-S. Ho. Non-blind image deconvolution with adaptive regularization. Advances in Multimedia Information Processing—PCM 2010, Lecture Notes in Computer Science, 2010, Volume 6297/2010, pages 719-730, Springer-Verlag Berlin Heidelberg 2010. Methods using image priors attempt to model typical properties of a good, that is to say sharp and noise-free, image. The image priors can be used in the deconvolution as regularisation and "penalise" results with pronounced artefacts. Image priors are, however, only a limited modelling of the perfect image, because the properties of a good image are also dependent on the object. Therefore, reconstruction using image priors can result in blurred reconstructed images. The quality of the resulting image can be of greatly differing quality depending on the object.

Coded apertures or phase masks, for example, can be used to produce images with extended depth of field. Aberrations are introduced which have the property of being readily deconvolvable, other aberrations (such as, for example, a defocus) being lost therein. After deconvolution, an image with a high depth of field is obtained. The optimum form of the coded aperture depends on the aberrations, so that it must be specially optimized and manufactured for each optical system. A specific coded aperture is frequently optimum in the corresponding optical system only for a very specific zoom and focus setting.

In addition, there are sharpening methods which require no or only limited information about the optical system. WO 05/031645 A, for example, describes a method in which a less sharp image is produced mathematically from an image taken in focus and those images are then combined mathematically, no information about the optical system being required. In methods that do not take optical imaging properties into consideration, the resulting image quality can be limited compared to deconvolution methods. Noise can be marked. Pronounced aberrations cannot be compensated for by methods that do not use information about the optical system.

SUMMARY

The object underlying the invention is to provide methods and apparatuses which offer improvements in respect of at least some of the above-described disadvantages of conventional methods. The object underlying the invention is in particular to provide methods and apparatuses which, even in the case of poorer imaging properties, which lead, for example, to zeros of the modulation transfer function and/or to a pronounced wavelength dependence of the optical transfer function, to reconstruct a high-quality image by digital processing. The object underlying the invention is in particular to provide methods and apparatuses which permit the reconstruction of a high-quality image even when using simple lenses, with wavelength-dependent aberration and at extreme zoom settings.

According to exemplary embodiments, a method and an apparatus having the features described in the independent claims are provided. The dependent claims define embodiments.

In some exemplary embodiments, at least one parameter of an optical system is purposively changed in such a manner that a plurality of single images with different optical transfer functions (OTFs), in particular also with different modulation transfer functions (MTFs), are captured. For example, a pupil aberration can purposively be changed before a second single image is captured, in order to capture two single images of the same object with different optical transfer functions. A mathematical reconstruction is carried out, which is dependent both on the two single images and on the optical transfer functions of the optical system upon capture of the single images. In some exemplary embodiments, the pupil aberrations can be so manipulated that the spatial frequency ranges in which the modulation transfer function upon capture of the first image leads to a low signal-to-noise ratio (SNR) are shifted upon capture of the second image into different spatial frequency ranges. Accordingly, those spatial frequency ranges which would remain hidden in the case of the capture of only one single image on account of the poor signal-to-noise ratio also become accessible in the reconstructed image. The pupil aberrations can thereby be manipulated for the acquisition of the single images in such a manner that, for each spatial frequency, at least one single image has a sufficiently great signal-to-noise ratio.

Alternatively or in addition to changing the aberration of the optical system, it is possible, for example by using a periodic illumination pattern, to shift spatial frequencies of the object in the single images relative to one another in order to shift the spatial frequency ranges of the object that correspond to low values of the modulation transfer function of the optical system and as a result have a low signal-to-noise ratio into spatial frequency ranges in which the modulation transfer function is greater and accordingly corresponds to a higher contrast.

In exemplary embodiments of the invention, at least two single images of the same object are acquired with different but known parameters of the optical system, for example with different pupil aberrations. These aberrations can be introduced, for example, by means of a rapidly switchable pupil filter, which can include devices such as connectable elements, microelectromechanical systems (MEMS), digital micromirror devices (DMDs), deformable mirrors, spatial light modulators, etc. In particular, a defocus can purposively be introduced, for example, in order to capture one of the single images. The introduction of a defocus can be attained on the one hand by a multifocal acquisition system in one shot or by the acquisition of two images with slight defocus in quick succession. The former allows the two slightly defocused images to be acquired in one shot, and the object is therefore in any case constant in both pictures. The latter can be carried out in such a manner that the images can be acquired in sufficiently quick succession that the object does not change. Because a defocusing can be achieved, for example, by shifting the sensor, such systems for introducing a defocus by acquiring images in quick succession are available. Exemplary embodiments of the present invention are, however, independent of the specific manner of achieving the defocusing and are equally as usable when defocusing is carried out with other methods or the pupil is manipulated in a different way.

In exemplary embodiments, the pupil aberrations can be manipulated in such a manner that the optical transfer function changes in dependence on the light wavelength. A plurality of single images can again be captured. In an optimization procedure, reconstruction can be carried out in a spectrally resolved manner. On the basis of the different sensitivities of the individual color channels for the individual wavelengths, different spectra, which per se are mixed in a color channel, can be separated. Accordingly, by purposively changing a parameter of the optical system, additional information is obtained, namely one or more further single images which have been captured with a different optical transfer function. This additional information can be used for the spectrally resolved reconstruction, that is to say deconvolution can be carried out in a spectrally resolved manner. Transverse chromatic aberrations can be compensated for digitally.

In a method of image reconstruction according to one exemplary embodiment, a plurality of single images are captured using an optical system, at least one parameter of the optical system automatically being changed in such a manner that it is different upon capture of at least two single images. An image is reconstructed in dependence on the plurality of single images and in dependence on information about optical transfer functions of the optical system upon capture of the plurality of single images.

In the method, additional information is obtained about the object by acquiring a plurality of images with the same field of view, even when the optical system is configured so simply that it exhibits, for example, zeros in the optical transfer function. By reconstructing the image using information about the optical transfer functions which are exhibited by the optical system upon capture of each of the plurality of single images and which can be different from one another, a high-quality image can be reconstructed even from a plurality of single images which are each of only low quality, for example owing to a high astigmatism and/or a defocus.

The change of the at least one parameter can include, for example, a change of an aberration of the system, a pupil manipulation, in particular the setting of a defocus for one of the single images, a change of a periodically spatially modulated illumination and/or a purposive relative movement between the object and the optical system.

A change of the at least one parameter can be chosen in dependence on at least one of the optical transfer functions exhibited by the optical system upon capture of the single images. The corresponding change of the parameter can be calculated in advance for the optical system in question in a preprocessing operation and stored in a memory of a control means. The change of the at least one parameter can be determined on the basis of an optimization procedure, for example in such a manner that, for each spatial frequency which can be detected by an image sensor of the optical system, at least one of the different modulation transfer functions has a value which is greater than a specified threshold value.

The change of the at least one parameter can include a change of an aberration of the optical system.

A first single image can be captured with a first optical transfer function. A second single image can be captured with a second optical transfer function which is different therefrom. The image can be reconstructed in dependence on both information about the first optical transfer function and information about the second optical transfer function. In particular, the at least one parameter can be changed in such a manner that not only is there a phase shift between the transfer functions, but the absolute value of the first optical transfer function (that is to say a first modulation transfer function upon acquisition of the first single image) is different from the absolute value of the second optical transfer function (that is to say of a second modulation transfer function upon acquisition of the second single image).

The change of the at least one parameter can be chosen in dependence on the spatial frequencies at which a first modulation transfer function, which is an absolute value of the first optical transfer function, is smaller than a threshold value, or in dependence on the spatial frequencies at which a second modulation transfer function, which is an absolute value of the second optical transfer function, is smaller than the threshold value. As a result, a purposive parameter change can be achieved in such a manner that spatial frequencies with a poor signal-to-noise ratio, that is to say a small value of the modulation transfer function, upon acquisition of the first single image are also detected with a higher contrast upon acquisition of the second single image.

The change of the at least one parameter can be so chosen that the second modulation transfer function is greater than the threshold value at those spatial frequencies at which the first modulation transfer function is smaller than the threshold value. The determination of the corresponding change of the parameter can be performed in a mathematical preprocessing operation, and the change of the parameter can be stored as corresponding control information in an embedded memory of the apparatus which carries out the method.

The image can be reconstructed in dependence on the spatial frequencies at which the first modulation transfer function is greater than the second modulation transfer function. In particular, there can be used for the reconstruction (frequency domain) data of the single image for which the associated modulation transfer function has the greatest value at the corresponding spatial frequency. That is to say, for those spatial frequencies at which the first modulation transfer function is greater than the second modulation transfer function, the (frequency domain) data of the first single image can be weighted more strongly than those of the second single image and vice versa. For the reconstruction, the information from the single image that exhibits the best signal-to-noise ratio for the corresponding spatial frequency can be used for each spatial frequency.

The change of the at least one parameter can be so chosen that, at each spatial frequency, at least one of the modulation transfer functions is greater than a threshold value.

If more than two single images are captured, the abovementioned criteria can be correspondingly generalised. For example, the reconstruction of the image can takes place in dependence on which of the modulation transfer functions for the different image acquisitions of the single images has the greatest value at a spatial frequency. The change of the at least one parameter for the different image acquisitions of the single images can be so chosen that, at each spatial frequency, at least one of the modulation transfer functions is greater than a threshold value. The change of the at least one parameter for the different image acquisitions of the single images can be so chosen that, at each spatial frequency, at least one of the modulation transfer functions is greater than a threshold value that is dependent on the noise at the corresponding spatial frequency.

The acquisition of the single images, or the change of the at least one parameter, can be implemented in such a manner that a maximum of the individual modulation transfer functions has as large a value as possible at all spatial frequencies. The acquisition of the single images, or the change of the at least one parameter, can be performed in such a manner that a maximum of the individual modulation transfer functions is as great as possible at all spatial frequencies.

The first optical transfer function can have a phase shift relative to the second optical transfer function. A corresponding change of the at least one parameter of the optical system which leads to a phase shift can be used in particular for multispectral, that is to say wavelength-resolved, reconstruction.

The image can be reconstructed in dependence on a wavelength dependence of the optical transfer functions upon capture of the single images. As a result, transverse chromatic aberrations can be compensated for digitally and/or a multispectral reconstruction can be carried out.

The optical system can comprise an image sensor having a plurality of color channels. The image can be reconstructed in dependence on a wavelength dependence of a sensitivity of the image sensor for the majority of color channels.

A multispectral reconstruction of the image can be performed. That is to say, a separate reconstruction can be performed for a plurality of light wavelengths. The number of wavelengths for which the image is reconstructed can be greater than the number of color channels of the image sensor. The information required for such a multispectral reconstruction is obtained by the capture of a plurality of images, the corresponding optical transfer functions and knowledge of the wavelength dependence of the optical transfer functions.

A number of single images which is captured can be determined automatically in dependence on a number of wavelengths for which the image is to be reconstructed. The larger the number of wavelengths for which the image is to be reconstructed, the larger the number of single images which can be captured. In order to obtain sufficient information for the multispectral reconstruction, a number J of single images which are captured and processed mathematically can be so chosen that $J \cdot L \geq K$, where L is the number of color channels of the image sensor and K is the number of wavelengths for which the image is to be reconstructed.

The change of the at least one parameter can be chosen to be optimized such that as much information as possible can be reconstructed from the images captured with a plurality of different optical transfer functions. Different optimization criteria can be used. For example, the change of the at least one parameter can be so chosen that, for each spatial frequency, at least one of the modulation transfer functions is sufficiently great to achieve a good signal-to-noise ratio at the corresponding spatial frequency. For a multispectral reconstruction using an optimization procedure which reconstructs the object in a wavelength-resolved manner from the plurality of captured single images and the associated optical transfer functions, the change of the at least one parameter can be so chosen that the optimization procedure is well-conditioned in the numerical sense. For a matrix formulation of the optimization problem, the change of the at least one parameter can be so chosen that the corresponding matrix is well-conditioned, that is to say has as good a condition as possible.

The optical transfer functions which are used for the digital reconstruction from the single images can be calculated by mathematical simulation of the optical system and/or by measurements on the optical system. The optical transfer functions can be calculated for different settings, for example different zoom settings, different defocus, etc. The determination of the parameter change, for example of a defocus or a different aberration change, can be performed on the basis of the optical transfer functions calculated by mathematical simulation of the optical system and/or by measurements on the optical system.

In a mathematical simulation of the optical system, different models can be used as the basis, for example an incoherent optical model, a coherent optical model, a partially coherent optical model, or a linear approximation of a partially coherent optical model.

Utilisation of the variation of at least one parameter of the optical system for capturing the single images can be based on a spectral coding. Spectral differences of the optical aberrations are thereby used. An aberration at a first light wavelength can be different from an aberration at a second light wavelength. If single images are captured with those different aberrations, for example by an image sensor having a plurality of color channels, the single images can be merged to an image of higher quality. The optical aberration can include, for example, a longitudinal chromatic aberration or can be a longitudinal chromatic aberration. A longitudinal chromatic aberration means that the different colors have different focal positions. In this case, use is made of the fact that spatial frequencies that have a low modulation transfer function contrast in one of the color channels have a different contrast which is as great as possible in one of the other color channels. The information missing from one color channel is thus obtained from other color channels. Good results are achieved in particular when the object is relatively constant with respect to the individual wavelengths, that is to say the object has, for example, the same geometric radiation pattern for the plurality of relevant wavelengths. For the design of the lenses, such an approach means that use can be made, for example, of longitudinal chromatic aberrations, which are actually to be avoided as far as possible.

The optical system can comprise a lighting device for lighting the object. Manipulation of the optical system can include controlling the lighting device in such a manner that a spatial frequency range of the object is shifted. To that end, a spatially periodically modulated lighting pattern can be produced, for example, and shone onto the object. Acquisition of the single images can then in each case be performed with the same optical transfer function. Control of the lighting device for the different image acquisitions of single images, for example the periodicity of the spatially periodically modulated lighting pattern that is set in each case, can be dependent on the optical transfer function. Control of the lighting device, for example the period of the spatially periodically modulated lighting pattern, for the different image acquisitions of single images can be dependent on the spatial frequency, or spatial frequencies, at which the optical transfer function exhibits a zero. The spatial frequency range of the object can be shifted by oblique lighting.

A control means can recognise a setting of the optical system upon capture of a first single image, determine the change of the at least one parameter, on the basis of a characteristic diagram, in dependence on the recognised setting, and control the optical system in such a manner that a second single image is captured with the changed at least one parameter. This can be carried out in such a manner that an optical transfer function of the optical system upon capture of the second single image is different from an optical transfer function upon capture of the first single image. Alternatively or in addition, a change can be effected, for example, by controlling a lighting which is used by the optical system to capture the single images.

The change of the at least one parameter can include one or more of the following measures:
  setting a pupil of the optical system,
  setting a defocus or a focal point,
  setting a longitudinal chromatic aberration,
  polarisation-coded manipulation, in particular by setting a Jones pupil,
  setting a spatial light modulation,
  setting a shift of spatial frequencies of the object by lighting,
  setting a two-dimensional orientation of the optical transfer function,
  setting an imaging scale, and/or
  setting a pixel size of an image sensor.

If a Jones pupil is set, the Jones pupil can have properties which can be controlled by electric commands. The Jones pupil can be produced by birefringent optically active or other polarisation-optical materials.

Alternatively or in addition, an apodisation filter can be used for manipulating the lightwave field. The apodisation filter can be controllable. The pupil can be made smaller by masking off.

Alternatively or in addition, manipulation can be implemented two-dimensionally in a non-rotationally symmetrical system, for example by influencing a component of the optical system in such a manner that the modulation transfer function is rotated relative to the image sensor.

Alternatively or in addition, a relative shift between the object and the optical system can be effected in order to bring about an effective change of the optical transfer function. A local change of the point spread function and accordingly of the optical transfer function can thereby be utilised.

Alternatively or in addition, zeros of a modulation transfer function of the optical system can be shifted by changing an imaging scale. Alternatively or in addition, the single images can purposively be captured with different pixel sizes. For example, a first image sensor with a first pixel size can be provided for capturing the first single image, and a second image sensor with a second pixel size can be provided for capturing the second single image.

Independently of the specific implementation of the change of the at least one parameter, this change can be adapted to different imaging conditions, for example to different light intensity or signal-to-noise ratios. To that end, current imaging conditions can be detected. It can automatically be determined how the at least one parameter is to be adjusted in each case for the capture of the plurality of single images. Likewise, it is possible to adapt the number of image acquisitions to the signal-to-noise ratio. The smaller the signal-to-noise ratio, the more images are to be acquired. An image reconstruction in which the image is reconstructed mathematically from a plurality of single images and using the corresponding optical transfer functions can selectively also be performed only under specific conditions, for example upon movement of the optical system during image capture or at specific zoom or focus settings.

The method can be so configured that wavelength-dependent aberrations can be compensated for by the multiple image capture with a change of the at least one parameter and subsequent digital reconstruction. The at least one parameter can purposively be so changed that the object can be resolved by the digital reconstruction with a spectral resolution that is greater than the spectral resolution of the image sensor. These techniques can be used to ensure a good signal-to-noise ratio for all spatial frequency range.

A multispectral reconstruction can include an optimization procedure with which a representation of the object is determined in a spectrally resolved manner, that is to say for a plurality of wavelengths. In order to solve this optimization problem, various optimization techniques can be used, for example an interior point method or an active set strategy. The optimization problem can be regularised. Image priors can be used for the regularisation. A Tikhonov regularisation can be used. A regularisation of the image noise can be used. Spectral changes of the object can be regularised.

When the multispectral reconstruction includes an optimization procedure, the change of the at least one parameter can be so chosen that the optimization problem is as well-posed as possible, that is to say is well-conditioned. When the images are described by a system matrix, the change of the at least one parameter can be so chosen that a condition of the system matrix is as good as possible. The condition of the system matrix can accordingly be chosen as the criterion for the determination of the change of the at least one parameter. The condition of the system matrix can be broken down into conditions of the submatrices belonging to a color channel of the image sensor.

When the multispectral reconstruction includes an optimization procedure, mathematical techniques of relaxation can be used.

The number of single images captured and processed in the reconstruction can be chosen in dependence on a strength of wavelength-dependent aberration changes. The number of single images can in particular be chosen in dependence on how pronounced the aberration changes with the wavelength. In a multispectral reconstruction, the number of single images captured and processed in the reconstruction can be chosen in dependence on the desired spectral resolution.

The acquisition of the plurality of single images can be done simultaneously. The plurality of single images can be recorded time-sequentially, a time interval between the acquisition of the single images being chosen to be smaller than a time threshold value.

According to a further exemplary embodiment, an apparatus for image reconstruction is provided, which apparatus comprises an optical system and a control means for controlling the optical system. The control means is configured to control the optical system for the capture of a plurality of single images, the control system automatically changing at least one parameter of the optical system so that it is different upon capture of at least two single images. The apparatus comprises a processing device for digitally reconstructing an image from the plurality of single images in dependence on the plurality of single images and in dependence on optical transfer functions exhibited by the optical system upon capture of each of the plurality of single images.

The control means and the processing device can be combined with the optical system in a common housing. The functions of the control means and the processing device can be carried out by the same processor. The apparatus can be in the form of, for example, a digital camera or another portable electronic device with an integrated camera.

The processing device can also be provided separately from a device that contains the optical system and the control means. For example, the processing device can be in the form of a separate analysis computer.

Embodiments of the apparatus and the effects attained thereby respectively correspond to the embodiments of the method. The control means can implement the corresponding change of the at least one parameter of the optical system. The processing device can implement the digital further processing of the captured single images.

Apparatuses and methods can be used in optical systems which have relatively simple lenses, for example cameras in mobile communication devices. Apparatuses and methods can, however, also be used in special applications, for example in microscopy or industrial measurement technology, for increasing quality by processing a plurality of single images.

BRIEF DESCRIPTION OF THE DRAWINGS

The invention will be explained in greater detail below by means of exemplary embodiments with reference to the accompanying drawings.

DETAILED DESCRIPTION

Figure 1:
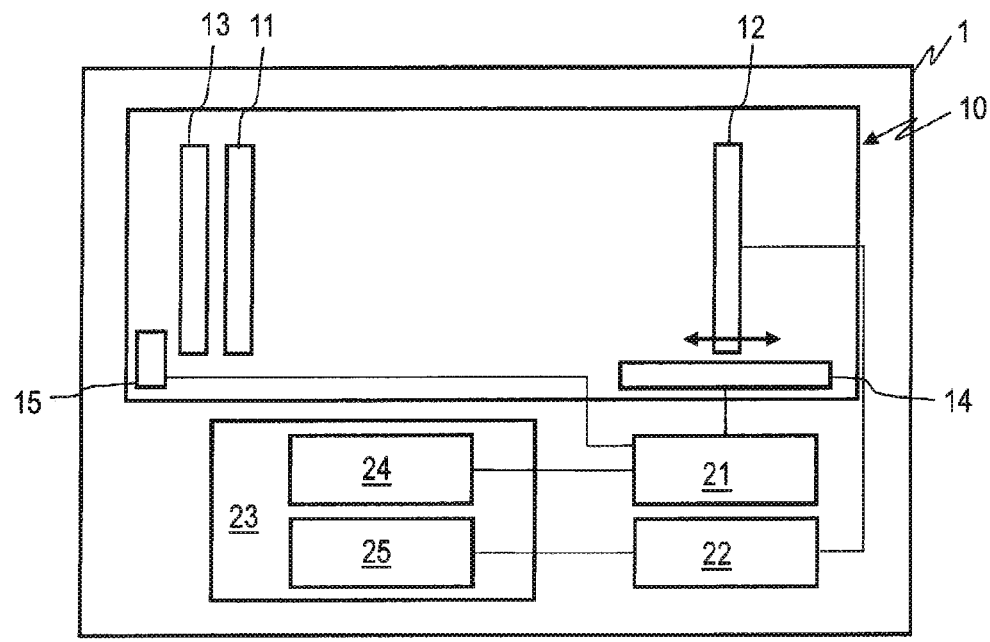
FIG. 1 shows a schematic representation of an apparatus according to one exemplary embodiment.

Exemplary embodiments of the invention are described in detail in the following. The features of different exemplary embodiments can be combined with one another, unless indicated otherwise. The description of an exemplary embodiment that combines a plurality of features is not to be interpreted as meaning that all those features are necessary for implementing the invention, because other exemplary embodiments may exhibit fewer features and/or alternative features.

In the figures, similar or identical elements are denoted by similar or identical reference numerals.

The exemplary embodiments described hereinbelow relate to methods and apparatuses for image reconstruction. A plurality of single images are thereby captured by means of an optical system. At least one parameter of the optical system is different for the capture of at least two single images. The at least one parameter can purposively be so adjusted that a desired change of the optical transfer function (OTF), for example of the absolute value of the optical transfer function or its phase, and/or a desired shift of the spatial frequencies of the imaged object is achieved. An image of the object is determined by digital reconstruction in dependence on the plurality of single images and information about the optical transfer functions upon acquisition of the single images.

A "digital reconstruction" is here understood as meaning an automatic processing of the plurality of single images, in which information relating to the plurality of single images is used to determine an image of high quality therefrom by processing.

The change of the at least one parameter can purposively be so carried out that the modulation transfer functions (MTFs) upon capture of the plurality of single images fulfil a specified criterion. That specified criterion can be chosen, for example, such that, for all the spatial frequencies which can be resolved with the image sensor, at least one of the different MTFs achieves a desired signal-to-noise ratio. Alternatively or in addition, the specified criterion can be chosen, for example, such that an optimization procedure with which a spectrally resolved deconvolution of the object takes place is as well-conditioned as possible.

FIG. 1 shows a schematic representation of an apparatus 1 according to one exemplary embodiment. The apparatus 1 comprises an optical system 10, a control means 21 and a processing device 22. The functions of the control means 21 and of the processing device 22 can be carried out by the same processor or by the same group of processors. The apparatus 1 can further comprise a memory 23, which stores information 24 about changes of one or more optical parameters for the capture of a plurality of single images. The memory 23 can further store information 25 about OTFs exhibited by the optical system 10 at different settings. The information 25 can contain, for example, the OTF as a function of the spatial frequency or the absolute value of the OTF, that is to say the MTF, as a function of the spatial frequency for a plurality of settings of the optical system.

The optical system 10 comprises an imaging lens 11 and an image sensor 12, which can be based, for example, on CMOS or CCD technology. In further forms, it is not necessary to provide a separate imaging lens 11, and the MTF of the image sensor 12 can be used for the methods described hereinbelow. One or more further optical components 13 can be provided. The further optical component 13 can be, for example, a polarisation-optical element, which forms a Jones pupil of the system, or an apodisation filter or another optical element, which can be controllable. The optical system 10 can comprise a lighting device 15, which is controllable, for lighting the object for image acquisition. At least one of the elements of the optical system 10 can be controllable in order purposively to influence an optical transfer function and/or a spatial frequency spectrum of the object. For example, the optical system 10 can comprise an adjustment device 14 with which the image sensor 12 can be adjusted in order purposively to set a desired defocus in a short time.

Alternative forms for the purposive manipulation of the optical system 10 for the capture of a plurality of single images, which are then processed together, are possible. For influencing the OTF of the optical system, one or more of the following techniques, for example, can be used: manipulation of a pupil of the optical system; setting of a defocus; setting of a longitudinal chromatic aberration; polarisation-coded manipulation, for example by setting a Jones pupil; manipulation of an imaging scale; manipulation of elements of the optical system for rotation of the MTF; changing an imaging scale; and/or manipulation of an apodisation filter.

Alternatively or in addition, the lighting device 15 can be controlled by the control means 21 for the purposive manipulation of the optical system 10 for the capture of a plurality of single images, which are then processed together. To that end, spatially modulated lighting can be delivered by the lighting device 15 in order to achieve a shift of spatial frequencies of the object. The control means 21 can then control the shift of spatial frequencies of the object by changing the spatial light modulation, for example by tilting the lighting device 15 or by controlling a deflecting mirror.

A corresponding change in the optical system 10 can be implemented automatically by the control means 21. The change can occur after acquisition of a single image and before acquisition of a further single image. If the optical system 10 comprises a plurality of separate image sensors with the same field of view for the simultaneous capture of a plurality of single images, a corresponding setting can selectively be made only for the section of the optical system that deflects light onto one of the image sensors. The control means 21 thereby ensures that, by changing the OTF and/or by shifting spatial frequencies of the object between at least two of the single images, additional information about the object can be obtained, as will be described in greater detail below. If the optical system 10 comprises a plurality of separate image sensors or a plurality of color channels, it is also possible, as an alternative, to work without actively adjusting any component of the optical system, and the MTF of the optical system, which changes wavelength-dependently, can be used to capture single images with different MTFs, which are then merged. The single images can be captured in different wavelength ranges. To that end, sensors that are sensitive at different wavelength ranges can be used. In this case, the optical system 10 can be in such a form that, as a result of the spectral dependence of the OTF, information about additional spatial frequencies of the object can be obtained by capture of the plurality of single images.

When an image is reconstructed from a plurality of single images during operation of the apparatus 1, the apparatus 1 operates as follows: The control means 21 determines a change of at least one parameter of the optical system, which is carried out in order to permit the capture of a plurality of different single images of the same object. The change of the parameter or parameters can be determined in dependence on settings of the optical system 10, for example in dependence on the zoom setting. To that end, the information 24 in the memory 23 can contain a corresponding characteristic diagram. The control means 21, in dependence on current settings of the optical system 10, can interrogate the characteristic diagram in the memory 23 in order to determine a suitable change of at least one parameter of the optical system 10. The control means 21 controls the optical system accordingly. The information 24 with the characteristic diagram can have various suitable formats, for example in the form of control values for the adjusting device 14, which facilitate simple implementation by the control means 21.

The information 24 that defines the change of parameters of the optical system for the capture of a plurality of single images can be determined in a preprocessing operation. The preprocessing operation, in dependence on OTFs or MTFs of the optical system, can determine the changes of parameters of the optical system that permit the best possible reconstruction for the plurality of single images. The information 24 stored in the memory 23 can be so chosen that, for the particular setting of the optical system, a change of the at least one parameter is implemented that ensures that the OTFs fulfil a specified criterion upon capture of the various single images, as will be described in greater detail hereinbelow.

In further forms, the control means 21, in dependence on the information 25 about the OTFs that is stored in the memory 23, can determine, during operation, a corresponding change of the at least one parameter that ensure that an image of higher quality can be reconstructed from the plurality of single images by automatic processing. For example, the information 25 can contain the MTF as a function of the spatial frequency for a plurality of settings of the optical system. During operation, the control means 21, starting from an initial setting of the optical system, can retrieve the associated MTF from the memory 23 and, in dependence thereon, determine mathematically a suitable change of at least one parameter of the optical system.

The processing device 22 processes the plurality of captured single images. The processing device 22 thereby carries out a reconstruction in which the plurality of single images and information about the OTFs upon capture of the single images are used. Information 25 about the OTFs of the optical system upon capture of the single images can be stored in the memory 23. For example, for the plurality of single images, which have been acquired in parallel in terms of time or in quick succession, the corresponding OTFs or MTFs can be contained in the information 25 as a function of the spatial frequency. The processing device 22 can retrieve the corresponding information from the memory 23 and use it to merge the single images to one image. For example, depending on which of the plurality of MTFs for the single images is the greatest or corresponds to the best signal-to-noise ratio (SNR) at a specific spatial frequency, the processing device 22 can use the (Fourier space) data of the corresponding single image for a reconstruction at the corresponding spatial frequency. Alternatively, the processing device 22 can specify a weighting of the plurality of single images in dependence on the MTFs for the single images or in dependence on a ratio of the MTFs at the corresponding spatial frequency. This will be described in greater detail below.

In further embodiments, the information about the OTFs which is used for the reconstruction can also be obtained from the captured single images. In particular, the corresponding contrast can be determined for the various single images at a plurality of spatial frequencies. The contrast provides information about the absolute value of the OTF upon capture of the corresponding single image, evaluated at the corresponding spatial frequency. The reconstruction can be carried out without prior determination of the optical imaging properties. For each individual spatial frequency, the information from the single image that exhibits the highest contrast for the spatial frequency can be used in the digital reconstruction. Because the underlying assumption is that the object is constant in all the individual acquisitions, this also means that the corresponding MTF for that frequency had the highest contrast, because the contrast in the resulting image is the product of the contrast of the object and the contrast of the MTF. Knowledge of the optical imaging properties continues to be advantageous for the choice of as good an optical aberration manipulation as possible.

In the apparatus 1, the optical system 10, the control means 21 and the processing device 22 can all be accommodated in a single device. In particular, the optical system 10, the control means 21 and the processing device 22 can all be mounted on or in the same housing. The apparatus 1 can be in the form of for example, a mobile communication device with an integrated camera, the control means 21 and the processing device 22 carrying out the capture of a plurality of single images with purposive manipulation of the optical system and digital reconstruction taking into consideration the imaging properties of the optical system.

Figure 2:
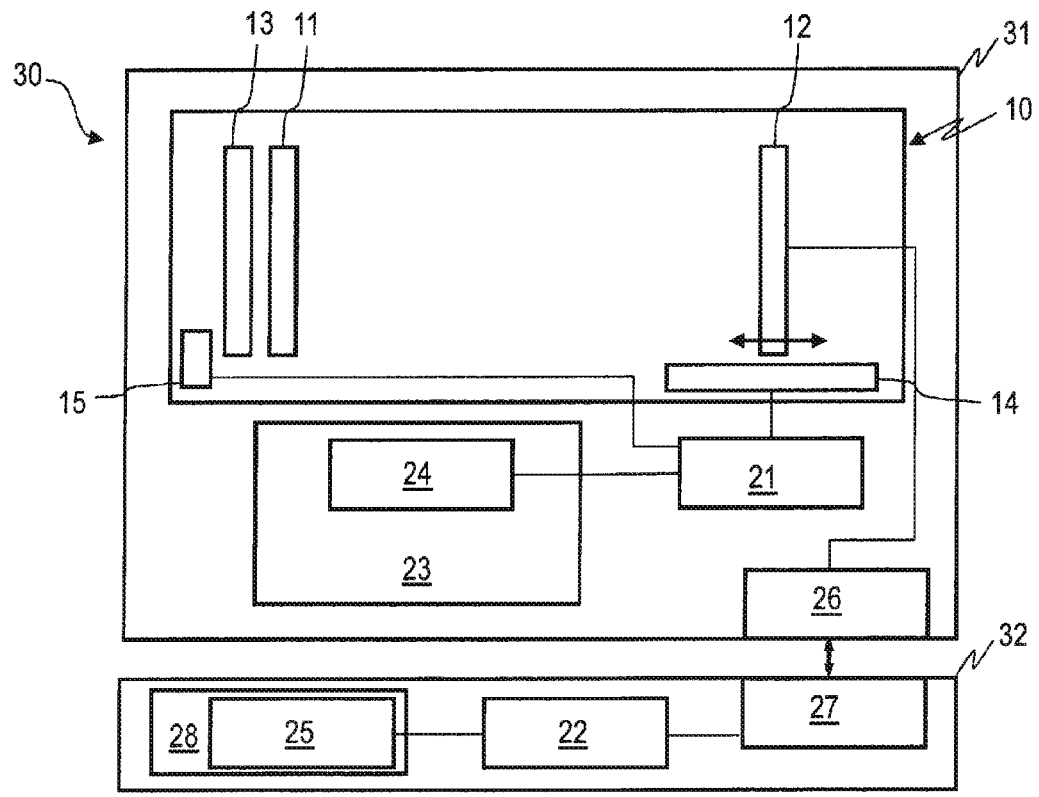
FIG. 2 shows a schematic representation of an apparatus according to a further exemplary embodiment.

FIG. 2 shows an alternative form of an apparatus 30 according to a further exemplary embodiment. A device 31 thereby contains the optical system 10 and the control means 21 as an embedded control means. An analysis computer 32 coupled to the device 31 comprises the evaluation device 22. The device 31 has an interface 26. The analysis computer 32 has an interface 27 coupled thereto for transfer of the captured single images. In addition, information about the settings of the optical system 10 during a first image acquisition and/or about the change of the at least one parameter can be transferred via the interfaces 26, 27. The evaluation device 22 can use that information to determine the OTFs or MTFs of the optical system upon acquisition of the single images from information stored in a memory 28 and use it in the merging of the single images.

Many other forms of apparatuses according to exemplary embodiments are possible. For example, the lighting device 15 can also be provided separately from the device 31.

The mode of operation of apparatuses and methods according to exemplary embodiments is described in greater detail with reference to FIGS. 3 to 15. While exemplary embodiments are explained by way of example in the context of a purposive change of the pupil aberration and in particular a purposive change of the defocus, other parameters of the optical system can also be influenced in order to change the OTF of the optical system and/or to effect a shift of spatial frequencies of the object relative to zeros of the MTF of the optical system.

Figure 3:
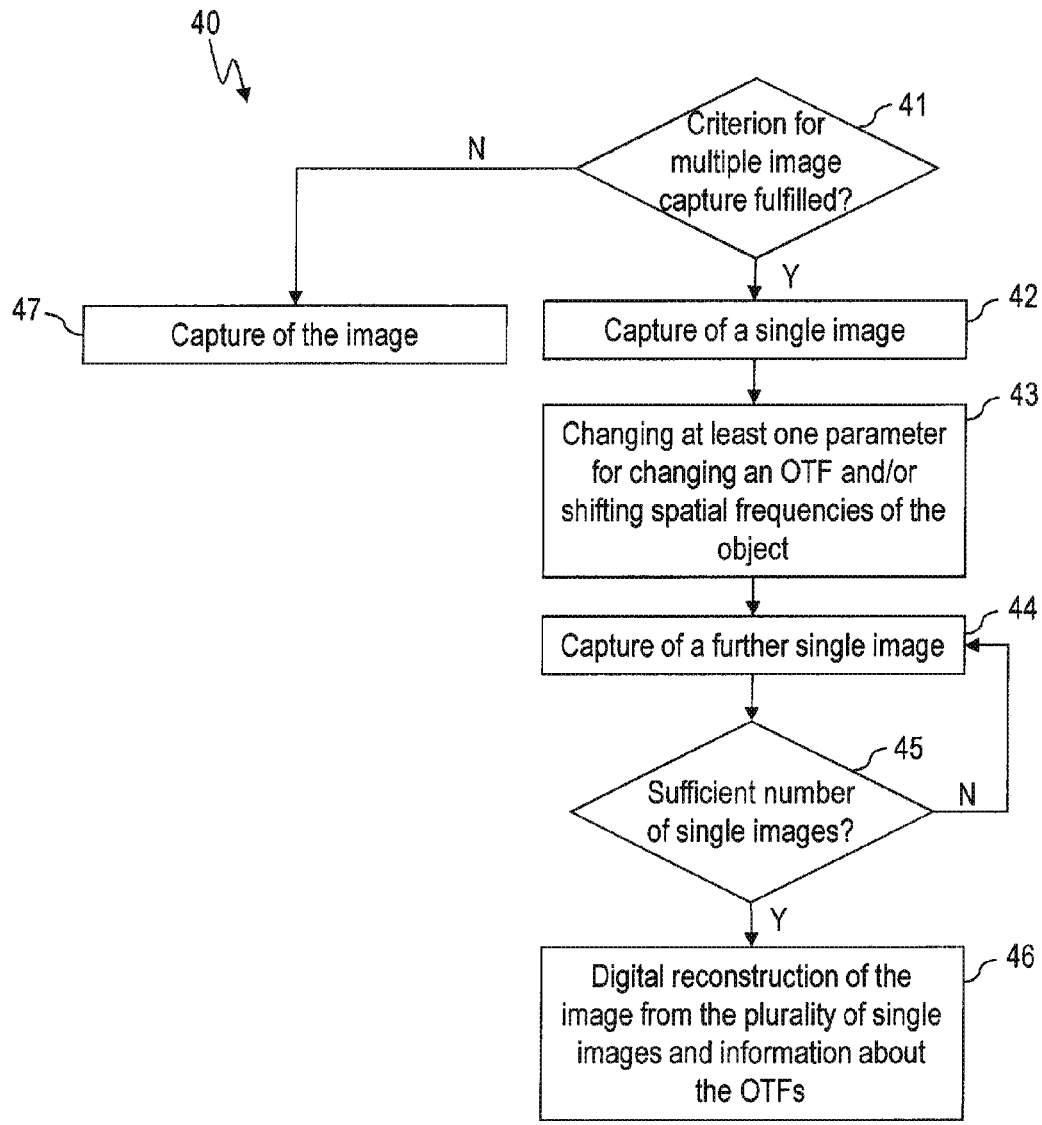
FIG. 3 is a flow diagram of a method according to one exemplary embodiment.

FIG. 3 is a flow diagram of a method 40 according to one exemplary embodiment. The method can be carried out automatically by apparatuses as have been described with reference to FIG. 1 and FIG. 2.

In step 41 it can be determined whether a single or multiple image capture is to be performed. This determination can be performed automatically in dependence on lighting conditions, ambient light, an estimation of a SNR and/or settings of the optical system. For example, an image reconstruction by capture of a plurality of single images with the same field of view and subsequent digital reconstruction can selectively be carried out only under weak lighting, at specific settings of the optical system, for example at specific zoom settings, and/or at a low SNR. If it is determined in step 41 that multiple image capture is not necessary, a single image is captured in step 47 in only one acquisition and the image of the object is reconstructed therefrom, for example by deconvolution by means of a Wiener filter or Lucy-Richardson method. If it is determined in step 41 that a multiple image capture is to be performed, the method continues with step 42.

In step 42, a first single image is acquired, the optical system having a first OTF.

In step 43, at least one parameter of the optical system is changed. This can be done, for example, by the purposive introduction of an aberration. A defocus can purposively be introduced, for example by relative movement between the image sensor and the lens system. Alternatively or in addition, a spatially modulated lighting pattern can be adjusted, for example by changing the angle of incidence of a striped pattern on the object in order thus to change the effective line spacing. The change of the at least one parameter in step 43 can be performed in such a manner that the OTF of the optical system thereby changes. The change of the at least one parameter in step 43 can be performed in such a manner that the absolute value of the OTF, that is to say the MTF, also changes. The change of the at least one parameter in step 43 can be performed in such a manner that the MTF of the optical system remains the same but a shift of spatial frequencies of the object is achieved. Independently of the specific implementation of the change of the parameter in step 43, the change takes place in a relatively short time interval, so that time-dependent changes in the field of view of the image sensor are negligible.

Independently of the specific implementation of the change of the parameter in step 43, the change of the parameter can be performed in dependence on and adapted to at least the first MTF of the optical system upon acquisition of the first single image. For example, the change of the parameter which is carried out in step 43 can be dependent on the spatial frequencies at which the first MTF is smaller than a threshold value. The change of the parameter which is carried out in step 43 can depend on the spatial frequencies at which the first MTF has a low contrast. The change of the parameter which is carried out in step 43 can depend on how well conditioned an optimization procedure that depends on the first OTF is. The change of the parameter which is carried out in step 43 can be performed in such a manner that the condition of the optimization procedure in which a wavelength-resolved, that is to say multispectral, representation is reconstructed is good. The change of the parameter which is carried out in step 43 can be performed in such a manner that the condition of a matrix used in the optimization procedure in which a wavelength-resolved, that is to say multispectral, representation is reconstructed fulfils a specified criterion.

Independently of the specific implementation of the change of the parameter in step 43, the corresponding change of the parameter can be calculated in advance and stored as suitable control information in the apparatus, in order to permit rapid automatic control of the optical system.

In step 44, a second single image is then captured. The capture of the second single image takes place in a time interval after capture of the first single image, the duration of which is smaller than a specified threshold value. The range, that is to say the field of view, captured in the second single image is substantially identical with the range captured in the first single image. On account of the change to the optical system carried out in step 43, the second single image is different from the first single image, even though the object remains the same. For example, the second single image can exhibit a purposively introduced blurring. By means of the digital reconstruction, the single images can be merged to an overall image of higher quality, even if the second single image is less sharp than the first single image.

In step 45, it can optionally be determined whether further single images are to be captured. If further single images are to be captured, the method returns to step 43. The new change of the at least one parameter can again be performed in dependence on control information calculated in advance. When further single images are captured, the change of the at least one parameter in step 43 and the acquisition of the further single image be performed in such a manner that the whole procedure from capture of the first single image to capture of the second single image can be concluded in a short time, that is to may in particular is smaller than a time threshold value. The determination in step 45 can be performed in dependence on different criteria. The number of single images to be captured can depend on the settings of the optical system, for example on a zoom setting. In a multispectral reconstruction, the number of single images to be captured can be so chosen that the product of the number of single images and the color channels of the image sensor is greater than a number of different light wavelengths for which a reconstruction is to be performed. The control means 21 can automatically determine the number of single images to be captured in dependence on information stored in the memory 23 and/or in dependence on a number of light wavelengths for which a spectrally resolved reconstruction is to be performed.

In step 46, a digital reconstruction takes place from the plurality of single images when no further single images are to be captured. The plurality of single images are thereby deconvolved and merged to an image of the object. In the digital reconstruction, information about the OTF of the optical system upon capture of the image is taken into consideration. For example, the absolute value of the OTFs, that is to say the MTFs, upon acquisition of the single images can be taken into consideration. It is also possible to take into consideration the phase information of the OTFs.

A weighting can be performed in such a manner that, for each spatial frequency, a greater weight is given to the single image for which the corresponding MTF at that spatial frequency is greater than the MTFs upon capture of the other single images. The weighting varies in dependence on the spatial frequency. Once a representation of the image to be reconstructed in the Fourier space has been determined as a superposition, weighted in dependence on the MTFs, of the single images in the Fourier space, a back transformation into the position space can be performed.

When spatial frequencies of the object are shifted for capture of the different single images, for example by spatially modulated lighting patterns, a weighting can be performed in dependence on whether the spatial frequency is shifted into a spatial frequency range in which the MTF of the optical system is smaller or greater than a threshold value.

In step 46, an optimization procedure can also be carried out, in which a target function that is to be minimised is dependent on the OTFs of the optical system upon acquisition of the single images.

By purposively changing the parameter in step 43 in dependence on at least the MTF of the optical system upon capture of the first single image in step 42, it is possible to reconstruct images of higher quality by processing the plurality of single images even in the case of a relatively simple optical system.

While the method 40 has been described with reference to a time-sequential acquisition of the single images, at least two single images can also be acquired simultaneously. To that end, a multifocal system, for example, can be used. All the single images from which an image is reconstructed in step 46 can be acquired simultaneously.

Figure 4:
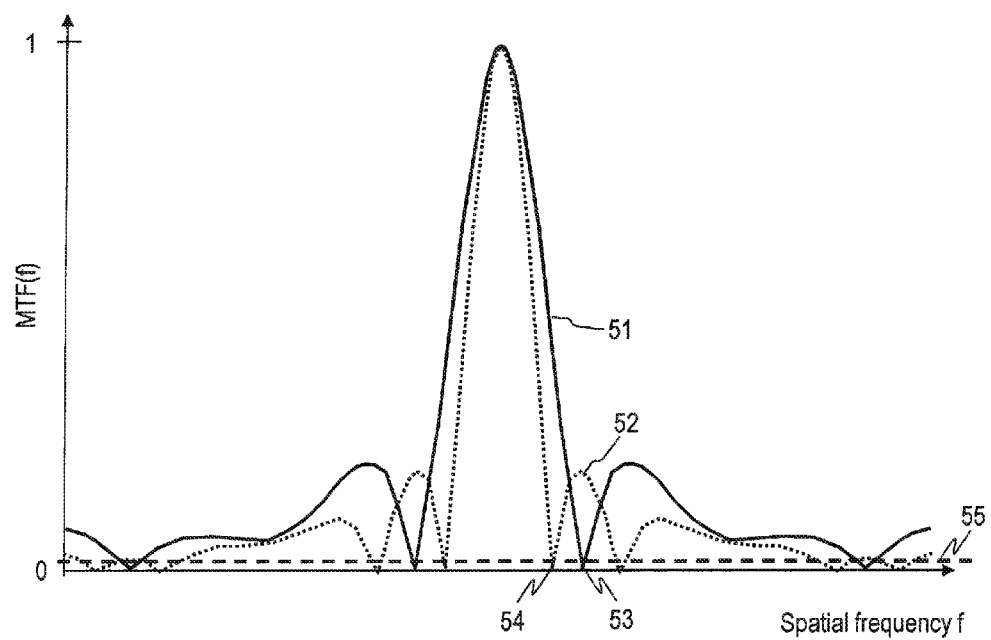
FIG. 4 illustrates the influencing of a parameter of an optical system in order to change a modulation transfer function of the optical system in methods and apparatuses according to exemplary embodiments.

FIG. 4 illustrates the mode of operation of apparatuses and methods in which the optical system is purposively influenced in order to capture a plurality of single images with different MTFs.

A first single image is captured with a first MTF 51, which is shown in dependence on the spatial frequency. In conventional terminology in this technical field, and for the purpose of better distinction from time frequencies, "spatial frequency" here refers to a spatial frequency which is defined, for example, in the coordinate system of the image sensor for a Fourier space representation. In the case of non-rotationally symmetrical systems, the spatial frequency is thus a two-dimensional vector in the Fourier space, which is assigned to the coordinates in the plane of the image sensor. FIG. 4 illustrates examples of MTFs by means of a section through the MTF.

A second single image is captured with a second MTF 52, which is shown in dependence on the spatial frequency. A change of at least one parameter of the optical system is so calculated that the first MTF 51 and the second MTF 52 fulfil a specified criterion. For example, the change of the at least one parameter of the optical system which is carried out for capture of the second single image can be so determined that the second MTF 52, at a spatial frequency at which the first MTF 51 has a zero 53, is other than zero. The change of the at least one parameter of the optical system which is carried out for capture of the second single image can be so determined that, at a spatial frequency at which the first MTF 51 is smaller than a threshold value, the second MTF 52 is greater than the corresponding threshold value. The change of the at least one parameter of the optical system which is carried out for capture of the second single image can be so determined that the first MTF 51, at a spatial frequency at which the second MTF 52 has a zero 54, is other than zero. The change of the at least one parameter of the optical system which is carried out for capture of the second single image can be so determined that the first MTF 51, at a spatial frequency at which the second MTF 52 is smaller than a threshold value, is greater than the corresponding threshold value. The change of the at least one parameter of the optical system which is carried out for capture of the second single image and/or further single images can be so chosen that, at each spatial frequency, in each case one of the MTFs is greater than a threshold value 55. The threshold value 55 can be dependent on the spatial frequency, for example in order to take account of the fact that the noise can also vary in dependence on the spatial frequency.

A corresponding change of the at least one parameter can be calculated in dependence on the first MTF 51, which in turn is dependent on the setting of the optical system, so that a specific criterion is fulfilled. The calculation can be performed before acquisition of the single images, and the calculated optimum change of the at least one parameter can be stored in a memory of the apparatus 1 or 30.

Figure 5:
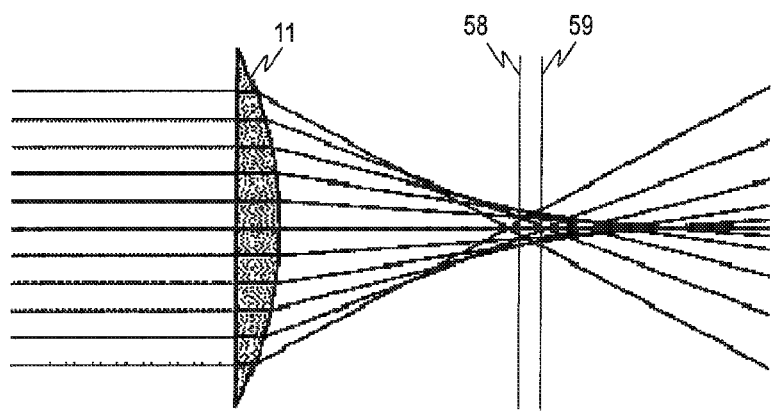
FIG. 5 shows a manipulation of the optical system by setting a defocus in methods and apparatuses according to exemplary embodiments.

FIG. 5 illustrates a purposive change of a parameter of the optical system which is achieved by introducing a defocus. For example, the position of the image sensor relative to the lens 11 can be so shifted that a first single image is captured at a first position 58 and a second image is captured at a second position 59. Although additional blurring is thereby introduced into one of the single images, the purposive change with subsequent digital reconstruction in dependence on information about the OTFs of the optical system allows an image of good quality to be produced.

Figure 6:
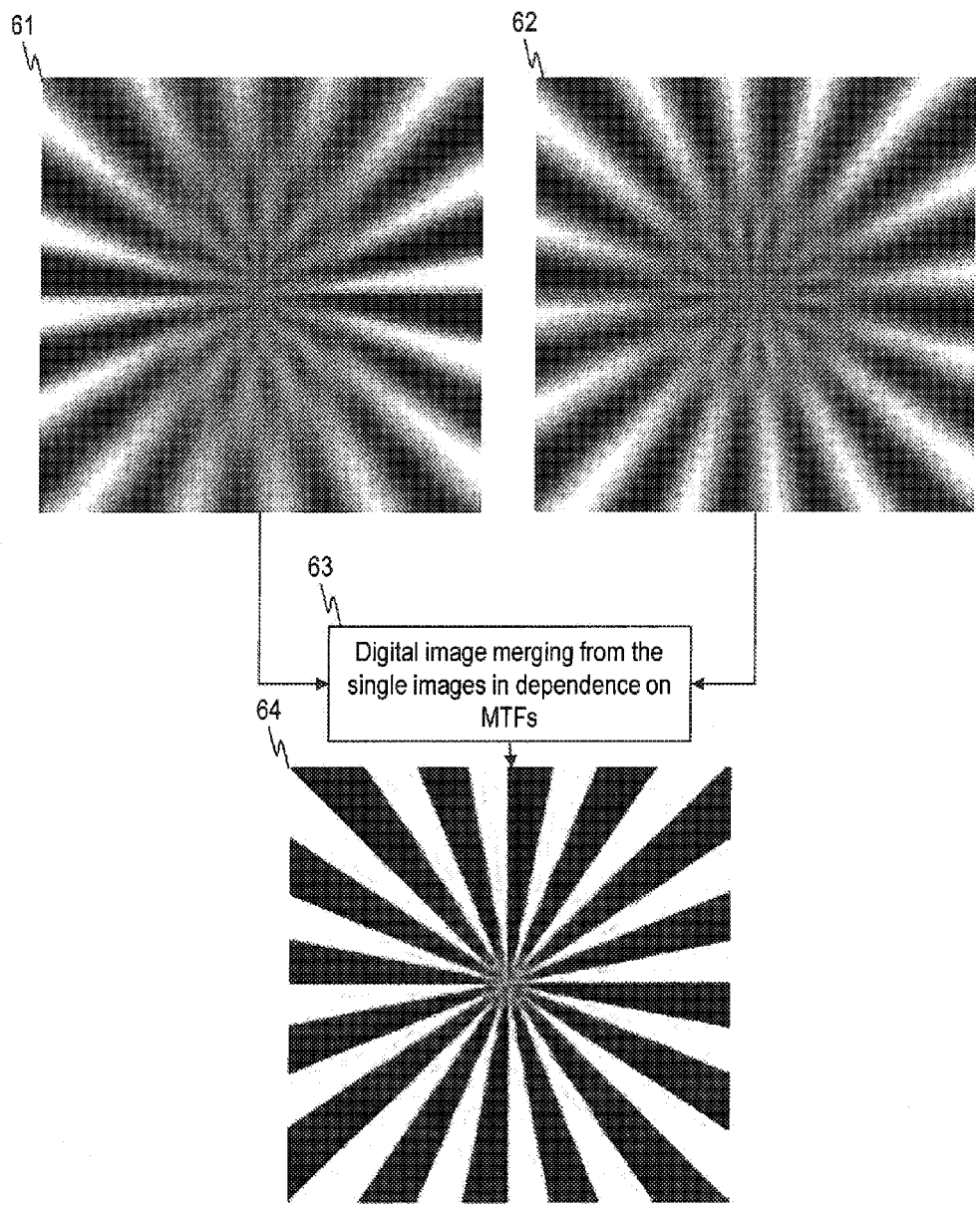
FIG. 6 illustrates the mode of operation of methods and apparatuses according to exemplary embodiments.

FIG. 6 illustrates, by way of example, the use of apparatuses and methods having an optical system which exhibits a comparatively large astigmatism.

A first single image 61 is captured. The optical system exhibits a pronounced astigmatism. Capture of the first single image 61 takes place with a first OTF, the absolute value of which is a first MTF.

A second single image 62 is captured. An additional defocus is thereby purposively introduced. Capture of the second single image 62 takes place with a second OTF, the absolute value of which is a second MTF. The corresponding defocus, or the corresponding change of the aberration, can be calculated in advance so that the first MTF and the wide MTF fulfil a specified criterion, as has been described with reference to FIGS. 1 to 5.

By digitally merging the images, which is shown schematically at 63 and which is dependent on information about the first OTF and the second OTF, an image 64 is reconstructed. A spatial frequency-dependent weighting of the (Fourier space) data of the first single image 61 and of the second single image 62, which is dependent on the relative size of the first MTF and of the second MTF, thereby takes place. In the image 64 reconstructed by methods and apparatuses according to exemplary embodiments, the quality of the image is increased significantly by the digital reconstruction from the single images 61, 62 taking into consideration the first MTF and the second MTF. Because the capture of the single images is so controlled that the first MTF and the second MTF fulfil a specific criterion, for example that at least in each case one of the MTFs is greater than a threshold value, artefacts can be kept small.

Figure 7:
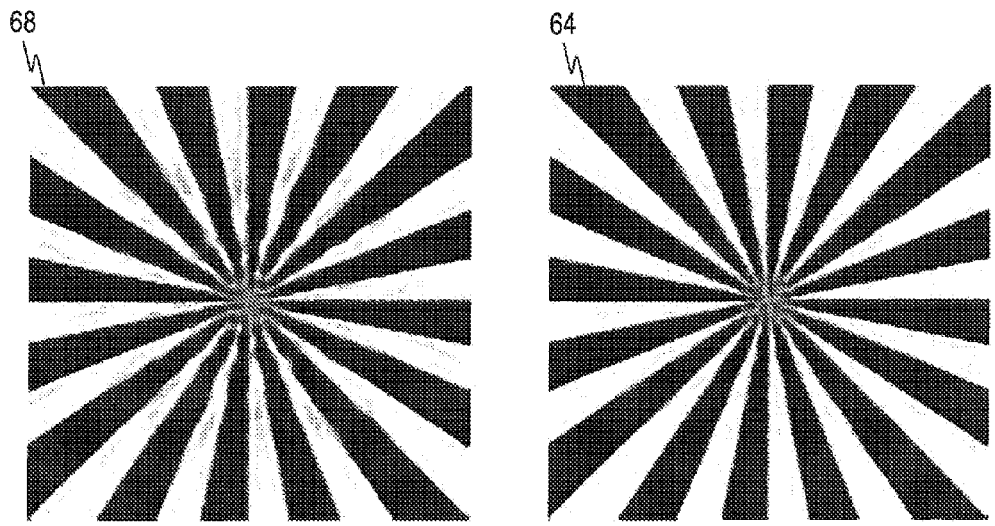
FIG. 7 shows an image which has been reconstructed by a method according to one exemplary embodiment, compared with an image which has been reconstructed by a conventional Lucy-Richardson method.

FIG. 7 illustrates improvements which can be achieved in comparison with conventional reconstruction techniques. The image 64 reconstructed by methods and apparatuses according to exemplary embodiments exhibits fewer artefacts than an image 68 reconstructed from the single image 61 by a conventional Lucy-Richardson method. The resulting deconvolved image 68 still has pronounced ringing artefacts, because the frequencies at which zeros occur in the MTF can no longer be reconstructed. By the purposive introduction of an additional defocus in methods and apparatuses according to exemplary embodiments, information about those spatial frequencies can be obtained from the second single image. To that end, the optical system is purposively manipulated in such a manner that the second MTF upon capture of the second single image leads to a higher contrast at the spatial frequencies at which the first MTF leads to a poor contrast, that is to say to a small SNR.

As explained with reference to FIGS. 4 to 7, the positions at which the MTF has a low contrast can purposively be shifted by an additional defocus. If the two MTFs 51, 52 in FIG. 4 are compared, it will be seen that the zeros are complementary, that is to say frequencies that are suppressed by one MTF are allowed to pass by the other and vice versa. By merging the single images, a good overall result can be achieved.

For a given optical system with known aberrations, an optimum pupil manipulation (for example by defocusing) or another change of at least one parameter can be so determined for the single acquisitions that, by skillfully combining the single images, all frequencies can be reconstructed. This is effected by purposive shifting of the zeros, or the spatial frequency ranges in which the MTF is smaller than a threshold value, by the aberrations that are introduced, or by another change of at least one parameter.

The deconvolved single images can be combined to a resulting image, wherein the respective spatial frequencies are taken in particular from the single image in which the best SNR for the spatial frequency in question is present.

Figure 8:
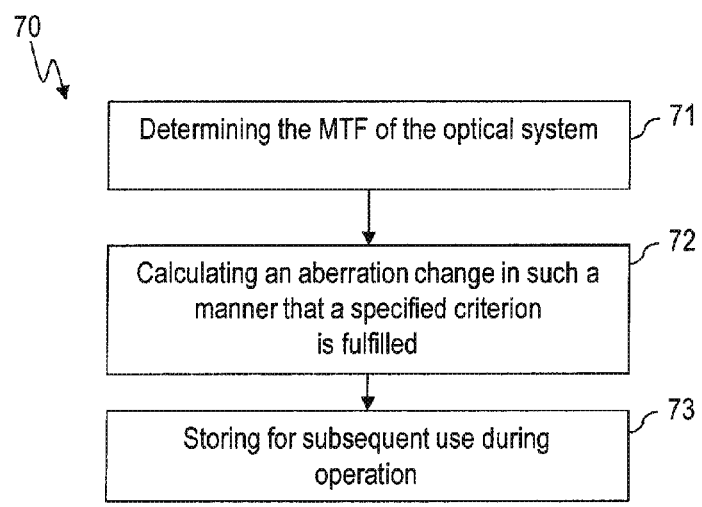
FIG. 8 is a flow diagram of a procedure for determining changes of at least one parameter in methods and apparatuses according to exemplary embodiments.
Figure 9:
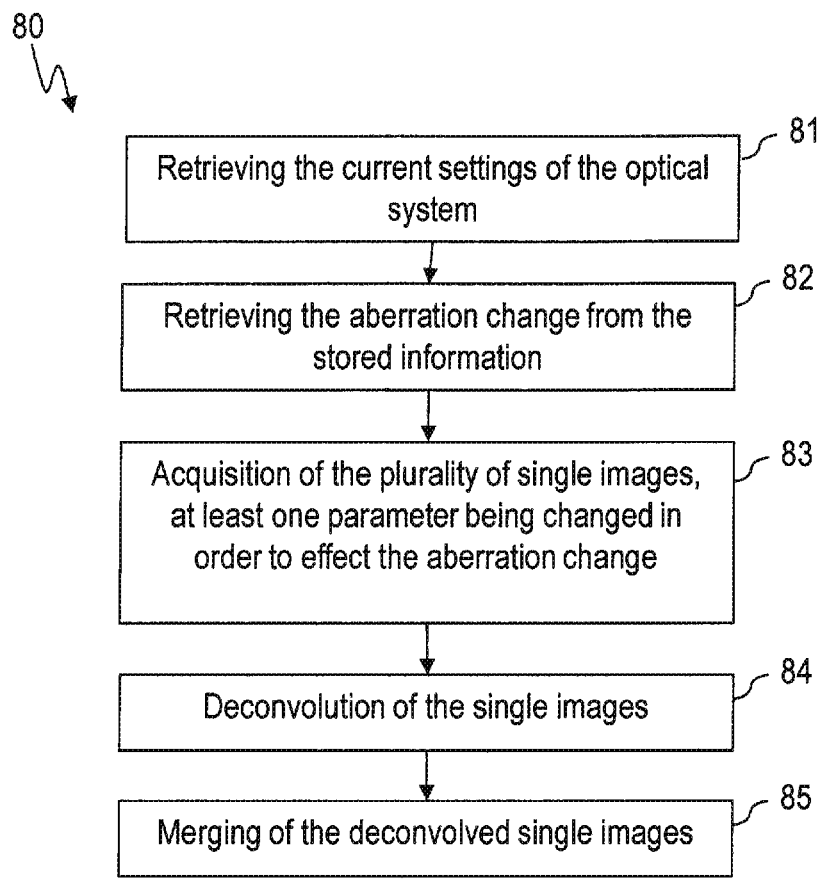
FIG. 9 is a flow diagram of a method according to a further exemplary embodiment.

With reference to FIG. 8 and FIG. 9, there are described in greater detail an apparatus and a method in which changes of the at least one parameter of the optical system are calculated and used in the acquisition of single images and the processing thereof to one image. The apparatus and the method are generally configured as follows:

An optical system is configured to capture two pictures, for example with different pupil aberrations, simultaneously or with a slight time difference, which pictures are used as single images for further processing. The optical aberrations for this optical system are determined. They can be the result, for example, of simple lenses, manufacturing deviations or movements of the camera. The aberrations can be detected, for example, by simulation of the lenses or by measurement techniques.

For given optical aberrations, the optimum aberration change can be determined. Possible forms are described in greater detail hereinbelow with reference to step 72 of method 70 of FIG. 8 for the case of an aberration change by defocusing, for example. The aberration changes are so chosen, for example, that, for each spatial frequency, the maximum SNR over all the single images is as large as possible. If the system has different zoom and focus settings or other adjustable settings, different aberration changes can be optimum for the settings. In this case, a purposive change of at least one parameter of the optical system for different settings is advantageously determined and stored.

The acquired single images can then first be deconvolved independently of one another. All conventional deconvolution methods can be used for this purpose, such as, for example, Wiener filter, Lucy-Richardson method, Landweber algorithm, etc.

The deconvolved single images are combined to a high-quality image. A spatial frequency-dependent weighting in dependence on the MTFs upon acquisition of the single images can be carried out. For example, for one spatial frequency, the corresponding data can be taken from the single image in which they are also present with high contrast, that is to say in which the MTF for the corresponding spatial frequency is great. Possible implementations are described in greater detail with reference to step 85 of method 80 of FIG. 9.

FIG. 8 is a flow diagram of a method 70 with which the information required for image capture and digital reconstruction of an image from a plurality of single images can be determined. At least steps 72 and 73 can be carried out by the apparatus according to an exemplary embodiment which also carries out the image capture and merging of the single images in the digital reconstruction. The method 70 can also be carried out by a separate computer, in order to determine information for image capture and digital reconstruction of an image which is then stored in the memory of apparatuses which carry out the image capture and merging of the single images in the digital reconstruction.

In step 71, the MTF of the optical system is determined. This can be done separately for several different settings of the optical system, for example for several different zoom settings, and/or different field positions.

In order to illustrate the subsequent processing, reference is made by way of example to an incoherent optical imaging model. The methods and apparatuses can, however, be used correspondingly for a coherent imaging model or for a linear approximation of a partially coherent imaging model.

Using the following conventional terms:
o: object that is reproduced and that is to be reconstructed;
psf: point spread function (PSF) of the optical system;
otf: optical transfer function (OTF) of the optical system;
mtf: modulation transfer function (MTF) of the optical system;
i: acquired image;
F: Fourier transformation;
$F^{-1}$: inverse Fourier transformation;
n: image noise (which can include photon and sensor noise), the imaging properties of the optical system can be modelled as follows:

$$i = psf * o + n \qquad (1)$$

wherein * is the convolution operator. That is to say, in the position space $$i(x) = \int o(s) psf(x-s) ds + n \qquad (2)$$

The convolution operator becomes a simple multiplication in the Fourier space:

$$(F(i))(f) = (F(o))(f)(F(psf))(f) + (F(n))(f) \qquad (3)$$

The optical transfer function is related to the point spread function according to $$otf(f) = (F(psf))(f). \qquad (4)$$

The modulation transfer function is the modulus of the optical transfer function $$mtf(f) = |otf(f)|. \qquad (5)$$

The spatial frequency f can generally be a two-dimensional vector. For rotationally symmetrical systems, it is sufficient to consider a section through the MTF for the following considerations. However, these apply generally also to the non-rotationally symmetrical case, the corresponding processing steps then being carried out while taking into consideration the fact that the spatial frequency f has two vector components.

The above equation (3) shows that, for spatial frequencies at which the MTF has the value 0 or relatively small values, the spatial frequencies are no longer present in the acquired image or are lost in the noise. Consequently, those spatial frequencies cannot be reconstructed, which can lead to pronounced image artefacts, as are to be seen, for example, in image 68 in FIG. 7.

In method 70, the MTF can be determined and/or calculated mathematically in step 71 from a measurement on the optical system. Various models can be used for that purpose, for example an incoherent optical model, a coherent optical model or a partially coherent optical model. The MTF can be calculated for several different settings of the optical system, for example for different zoom positions.

In step 72 it can be determined, in dependence on the MTF or MTFs of the optical system, how a parameter of the optical system is to be changed for the capture of single images in order to permit the merging of the single images to an image of high quality. The change of the at least one parameter can thereby be so chosen that the MTF for the original setting of the optical system and the MTF resulting from the corresponding change of the at least one parameter fulfil a specific criterion.

For example, a value D for at least one parameter can be determined in such a manner that, at each spatial frequency, the smaller of the MTF for the original setting of the optical system and the MTF resulting from the corresponding change of the at least one parameter is as great as possible. To that end, the value D can be calculated, for example, by mathematical evaluation in such a manner that $$D=\text{argmax}_d\{\inf_{f\in C}\{\max(\text{mtf}(f),\text{mtf}_d(f))\}\} \quad (6)$$

where mtf(f) is the MTF of the aberrated optical system, where appropriate for the corresponding setting of the optical system, and $\text{mtf}_d(f)$ is the MTF of the aberrated optical system with a changed parameter d. d can be, for example, an additional defocus. In this case, by solving the optimization problem of equation (6), the defocus D for which the greater value of mtf(f) and $\text{mtf}_d(f)$ in the entire relevant spatial frequency range is as great as possible is calculated. C denotes all relevant spatial frequencies, for example the spatial frequencies up to the diffraction limit. By a corresponding solution of equation (6), it is possible to achieve a high contrast, that is to say a high value in one of the two MTFs, for as many as possible or, in the ideal case, for all of the frequencies within C. The MTF of the aberrated optical system with a changed parameter d, $\text{mtf}_d(f)$, can, for example, likewise be determined mathematically. Corresponding simulation procedures for optical systems are known to the person skilled in the art and are available.

In a further form, an optimization can be carried out in such a manner that there is calculated the change D of the parameter, for example a defocus, for which $$D=\text{argmax}_d\{\int w(f)\max(\text{mtf}(f),\text{mtf}_d(f))df\} \quad (7)$$

where w(f) is a weighting function. The weighting function can be constant, for example equal to one, but can also vary as a function of the spatial frequency. Accordingly, in an optimization according to equation (7), the change D of the parameter can be so determined that a weighted mean of the maximum of the MTFs has as great a value as possible.

In a further form, an optimization can be carried out in such a manner that there is calculated the change D of the parameter, for example a defocus, for which $$D=\text{argmin}_d\{\int w(f)\delta(\max(\text{mtf}(f),\text{mtf}_d(f))<s)df\} \quad (8)$$

where $$\delta(u<v)=\begin{cases}1 & \text{if } u<v \\ & \text{otherwise} \\ 0 & \text{sonst}\end{cases} \quad (9)$$

is a step function. Accordingly, in an optimization according to equation (7), the change D of the parameter can be so determined that there is a penalty if both MTFs slip below a certain threshold s. The threshold s can be chosen in dependence on the noise. Because the above optimization problem contains the discontinuous function δ, it can be expedient to use methods of mathematical relaxation here.

Numerous further criteria for determining the change of the at least one parameter are possible. For example, it can be sufficient to find a change D of the parameter for which it is ensured that, at each spatial frequency in C, at least one of the MTFs is greater than a threshold value s, that is to say D can be so determined that $$\inf_{f\in C}\{\max(\text{mtf}(f),\text{mtf}_D(f))\}\geq s \quad (10).$$

The threshold value s can again be dependent on the noise.

Spatial dependencies in the aberration can likewise be taken into consideration. To that end, various field positions p can be taken into consideration when the corresponding optimization is carried out. A determination of an optimum change D of the parameter based on equation (6) would be modified, for example, to $$D=\text{argmax}_d\{\min_p\{\inf_{f\in C}\{\max(\text{mtf}^p(f),\text{mtf}_d^p(f))\}\}\} \quad (11)$$

where $\text{mtf}^p$ is the MTF at field position p.

If a plurality of color channels are present, the optimum defocus is to be suitable for all the color channels. A determination of an optimum change D of the parameter based on equation (6) would then be modified, for example, to $$D=\text{argmax}_d\{\min_1\{\inf_{f\in C}\{\max(\text{mtf}^1(f),\text{mtf}_d^1(f))\}\}\} \quad (12)$$

Of course, the criteria of equations (11) and (12) can also be combined.

These approaches for determining as good a change D as possible of at least one parameter of the optical system can be carried out separately for different zoom and focus settings and then used precisely for those settings. Instead of the defocus, it is also possible in each of the techniques described above to effect optimization via another changeable parameter of the optical system, such as, for example, the diameter of the pupil of the optical system, which can be adjustable by means of a controllable annular orifice, longitudinal chromatic aberrations, setting of a Jones pupil, setting of an apodisation filter, imaging scale, zoom factor, etc. Optimization can also be effected via a combination of a plurality of such parameters.

The description of the determination of only one changed value of the parameter, which corresponds to the case of the acquisition of two single images, is only by way of example. For example, all methods can be transferred to the acquisition of more than two single images.

After calculation of the change of the at least one parameter, in step 73 the change of the at least one parameter is stored for subsequent use. The corresponding value can be stored in a number of different ways, for example as a control command which is implemented by the control means 21 of the apparatus during image capture, as a numerical value which indicates a desired setting for a position of the image sensor, as a numerical value which indicates a position change between acquisition of the first and second single images, or the like. If the optical system has several settings, for example several zoom and focus settings, a characteristic diagram can be stored which specifies the change of the at least one parameter in dependence on the setting of the optical system.

In addition, in step 73 the MTFs of the optical system, in particular both the MTF without a change of the parameter and the MTF with the specified optimum change D of the at least one parameter, can be stored for use in the image reconstruction from the single images.

The steps described with reference to the method of FIG. 8 must only be carried out once in the case of optical aberrations and when compensating for manufacturing deviations. The calculated changes of the at least one parameter, that is to say defocus or the like, which are to be used for the capture of single images can be used in a plurality of devices with an optical system of the same construction.

FIG. 9 is a flow diagram of a method 80 according to an exemplary embodiment. The method 80 can be carried out by an apparatus according to an exemplary embodiment. The information determined and stored by method 70 of FIG. 8 can thereby be used. The methods 70 and 80 can also be carried out by the same apparatus.

In step 81, if an image is to be captured, instantaneous settings of the optical system are retrieved. For example, a zoom setting and/or focus setting can be retrieved.

In step 82 it is determined how at least one parameter of the optical system is to be changed for the capture of a plurality of single images. The corresponding change can be retrieved from a memory by a control means. The corresponding change can be retrieved from the memory by interrogation dependent on the current setting determined in step 81. The change of the at least one parameter can influence an aberration of the optical system. The change of the at least one parameter can alternatively or in addition effect a shift of spatial frequencies of the object.

In step 83, a plurality of single images are acquired, the at least one parameter being changed according to the change determined in step 82. For example, a first single image can be captured without additional defocus and a second single image can be captured with a purposively introduced additional defocus, which is determined in step 82. The change of the at least one parameter can be performed in such a manner that a modulus of the OTF, that is to say the MTF, and/or a phase of the OTF thereby changes. Alternatively or in addition, the change of the at least one parameter can be performed in such a manner that a shift of spatial frequencies of the object is thereby achieved, for example by spatial light modulation of the lighting.

In step 84, the single images can be deconvolved. All conventional deconvolution methods can be used for that purpose, such as, for example, Wiener filter, Lucy-Richardson method, Landweber algorithm, etc.

In step 85, the deconvolved single images are merged for digital reconstruction of the image. The merging is carried out in dependence on information about the OTFs of the optical system upon capture of the single images. A spatial frequency-dependent weighting based on the MTFs upon acquisition of the single images can be performed. In the image merging, for each of a plurality of spatial frequencies, a greater weighting can be assigned to the (Fourier space) data of the single image for which the MTF at the corresponding spatial frequency is the greatest. This is shown hereinbelow by way of example for the digital reconstruction in which two single images are merged. If a plurality of single images are available, the methods can be applied with corresponding modification. The described merging techniques can additionally also be used when another type of aberration change takes place instead of defocusing.

In the following, i is the acquired image without additional defocus and $i_D$ is the image with the additional defocus, wherein D has been calculated, for example, by an optimization method described with reference to FIG. 8 or a modification thereof. r and $r_D$ are the reconstruction results which have been reconstructed from i and $i_D$, possibly containing artefacts, and have been calculated, for example, by the Lucy-Richardson method.

A method is required which produces a merged resulting image g and which weights more greatly the frequencies from the image in which they are contained with a higher SNR. This can be achieved, for example, as follows in the Fourier space:

$$(F(g))(f) = \delta(\text{mtf}(f) \leq \text{mtf}_D(f))(F(r_D))(f) + \delta(\text{mtf}_D(f) < \text{mtf}(f))(F(r))(f) \quad (13)$$

where δ again denotes the step function defined in equation (9).

Further methods of MTF-dependent merging can be used. For example, a merging can be carried out according to $$(F(g))(f) = \frac{\text{mtf}(f)(F(r))(f) + \text{mtf}_D(f)(F(r_D))(f)}{\text{mtf}(f) + \text{mtf}_D(f)}. \quad (14)$$

Figure 10:
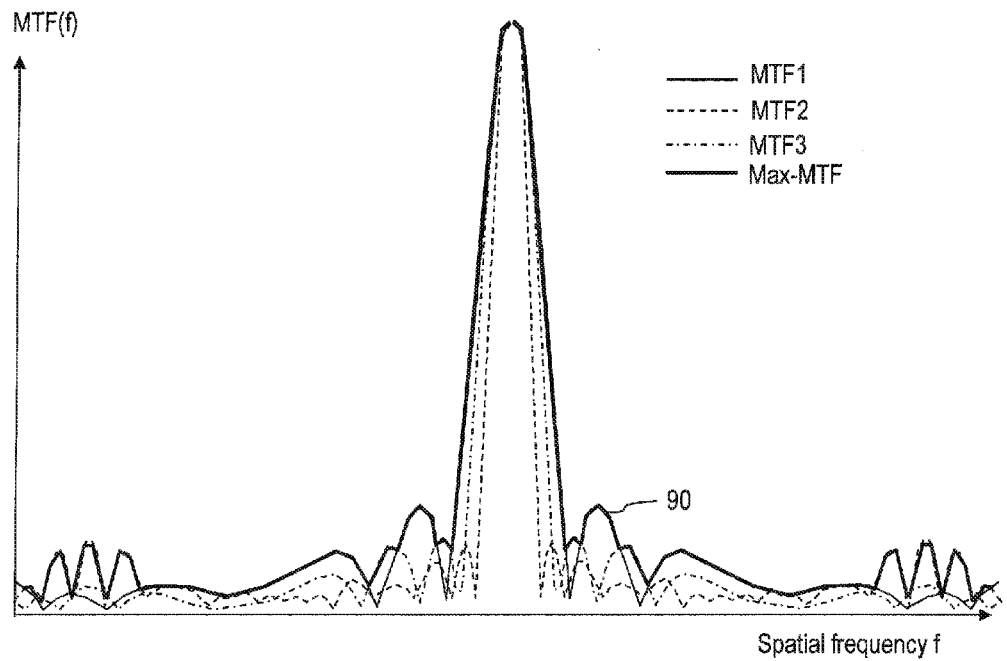
FIG. 10 illustrates the influencing of a parameter of an optical system in order to change a modulation transfer function of the optical system in methods and apparatuses according to exemplary embodiments.

FIG. 10 illustrates the spatial frequency-dependent weighting for the acquisition of three single images. At least one parameter of the optical system is purposively influenced in such a manner that a plurality of single images which depict the same object are captured simultaneously or at short time intervals with a plurality of different MTFs (MTF1, MTF2, MTF3). A digital reconstruction, in which the (Fourier space) data are weighted in a spatial frequency-dependent manner according to equation (13), has the effect that data from the single image for which the MTF is in each case maximum are effectively used. The maximum 90 of the MTFs is available as the effective MTF for the reconstruction. A reconstruction is thus also possible for the spatial frequencies at which one of the MTFs exhibits a zero or otherwise becomes so small that the SNR at the corresponding spatial frequency is poor.

By means of methods and apparatuses according to exemplary embodiments it is possible to achieve a quality increase also for the case that the MTF does not possess an exact zero, but the SNR is only increased in certain spatial frequency bands by the manipulation and the effective MTF in the above-described sense has higher values for certain spatial frequencies. In this case, the reconstruction quality is likewise improved.

In further forms, alternatively or in addition to a change of the MTF, a shift of spatial frequencies of the object that is reproduced can be achieved in the acquisition of the single images. To that end, a spatial light modulation can be carried out. In at least one of the acquisitions of a single image, the lighting device 15 of the apparatus can be so controlled that the object is illuminated with a spatially periodically changing lighting pattern. The lighting pattern, and thus the spatial frequency shift that is achieved, can be chosen in dependence on the MTF of the optical system upon acquisition of the single images.

Figure 11:
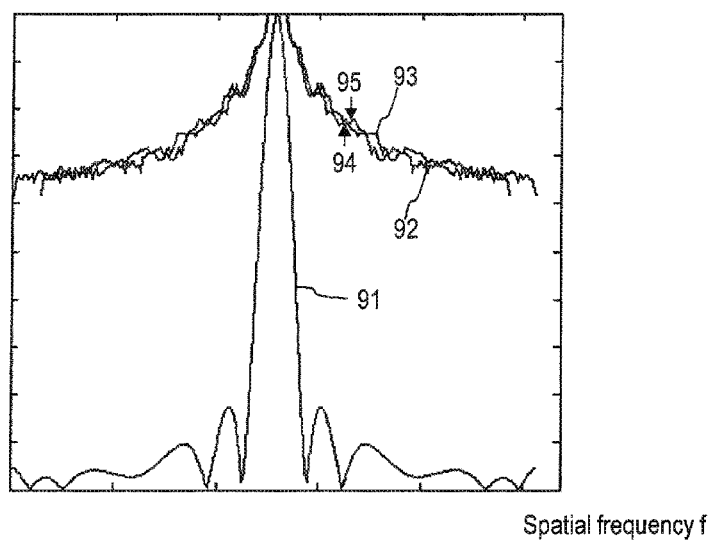
FIG. 11 illustrates the influencing of a parameter of an optical system for purposively shifting spatial frequencies of an object in methods and apparatuses according to exemplary embodiments.

FIG. 11 illustrates an image reconstruction in which the spatial frequency spectrum of the object in the individual pictures is manipulated. This is possible, for example, by appropriate lighting. A plurality of single images each with the same MTF 91 are captured. During acquisition of a first single image, in which the object is lit, for example, homogeneously or with a first light modulation, the object in the first single image has a first Fourier space representation 92. During acquisition of a second single image, the object is irradiated with a lighting pattern such that a spatial frequency shift occurs. The object in the second single image has a second Fourier space representation 93, which is shifted relative to the first Fourier space representation 92 as a function of the spatial frequency. On account of a zero of the MTF 91, the information 94 in the first Fourier space representation 92 from the first single image cannot be reconstructed. As a result of the spatial frequency shift upon acquisition of the second single image, the corresponding information is shifted in the second Fourier space representation 93 to a point 95 at which the MTF 91 is other than zero. Using the shift of the spatial frequencies, which can be carried out purposively and in dependence on the zeros of the MTF 91, a reconstruction of high quality can be performed by merging the first and second single images.

While methods and apparatuses according to exemplary embodiments have been described with reference to FIG. 8-11, numerous modifications can be made in further exemplary embodiments.

It is possible to acquire more than two images with different aberration changes in order to increase the image quality still further and/or to be able to permit even more pronounced aberrations. A shift of zeros of the MTF can be performed other than by defocusing. An image reconstruction from a plurality of single images can be carried out, according to the optical system, selectively only in the case of specific focus or zoom settings at which the MTF has smaller values.

While in method 80 of FIG. 9 the single images are first deconvolved and then merged, it is possible in further forms first to carry out merging of the single images and only then to carry out a deconvolution. In yet further forms, steps 84 and 85 can be carried out in a single step.

Different effects can be achieved with methods and apparatuses as have been described with reference to FIGS. 1 to 11. Cost advantages are achieved in comparison with the use of high-quality lenses. By the acquisition of a plurality of images with purposive aberration changes it is possible to deconvolve by simple means (for example defocusing by shifting of the image sensor) aberrations which cannot be compensated for with current approaches. The method can be adapted to all lenses, manufacturing accuracies, camera movements without a great outlay.

In methods and apparatuses according to exemplary embodiments, an image reconstruction can also be made possible when the optical aberrations change with the wavelength. This can be the case with poorer optical systems. The acquisition and digital processing of a plurality of single images also permits multispectral reconstruction, that is to say a reconstruction carried out for a plurality of wavelengths. The change of the OTF as a function of the light wavelength can be taken into consideration in the reconstruction. It is also possible to take into consideration a wavelength-dependent sensitivity of the image sensor, or of its color channels.

An image to be reproduced typically changes with the light wavelength, that is to say it has a first spatial pattern for a first light wavelength and a second, different spatial pattern for a second light wavelength. Specifically with simpler optical systems, there can be a dependence of the PSF on the wavelength, that is to say the PSF changes with the wavelength. Even a simple transverse chromatic aberration changes the PSF. The transverse chromatic aberration manifests itself, for example, as a shift of the PSF. It would be desirable to take such effects into consideration and to compensate for them at least in part. In particular, it would be desirable also to be able to compensate for transverse chromatic aberrations digitally.

An image sensor captures in a color channel, taking into consideration wavelength-dependent effects, the following image:

$$i_l = \int_{\lambda_{lc}}^{\lambda_{uc}} \alpha_l(\lambda)(h(\lambda) * o(\lambda)) d\lambda. \quad (15)$$

where l denotes an index for color channels, $l=1, \ldots, L$, wherein L is the number of color channels. In practice, mostly L=3 and corresponds to the three colors blue, green and red. In equation (15), $o(\lambda)$ denotes the wavelength-dependent object, $h(\lambda)$ the wavelength-dependent PSF and $\alpha_l(\lambda)$ the sensitivity of the channel l in dependence on the wavelength. The values $\lambda_{lc}$ and $\lambda_{uc}$ are the lower and upper bounds of the light spectrum used. The image $i_l$ and the object o in equation (15) describe the acquired image, or the object, that is to say are position-dependent functions. The wavelength-dependent PSF h can also be locally variable, that is to say the form of the PSF is dependent not only on the wavelength but also on the position.

The integral of equation (15) can be discretised as follows:

$$i_l = \Sigma_{k=1}^{K} \alpha_{k,l}(h_k * o_k). \quad (16)$$

The index k represents wavelengths at which the wavelength spectrum is sampled. K is the number of different wavelengths. The larger K, the more accurate the discretisation. $h_k$ represents the monochromatic PSF for the wavelength with index k, and $\alpha_{k,l}$ represents the sensitivity in the color channel l at the wavelength with index k, that is to say $\alpha_{k,l} = \alpha_l(\lambda_k)$. A polychromatic PSF for the color channel l can be defined as $$h_l = \Sigma_{k=1}^{K} \alpha_{k,l} h_k. \quad (17)$$

Conventional approaches, in which a wavelength dependence of the PSF and accordingly of the OTF is taken into consideration, can use the polychromatic PSF defined in equation (17). This can lead to various disadvantages. Because the spectral sensitivity range of a color channel represents an interval, the PSF in the sensitivity range of a color channel also changes. The PSF can change the form and/or the position, which corresponds to a transverse chromatic aberration. This is a particular problem when the sensitivity range of a color channel covers a relatively large interval of the optical spectrum.

However, a deconvolution using the polychromatic PSF defined in equation (17) would permit only limited compensation of transverse chromatic aberrations. Because it is possible to compensate only for the shift between two color channels, the transverse chromatic aberration within the sensitivity range of a color channel can persist and lead to blurring. In addition, it is desirable in some applications to carry out a "multispectral" reconstruction at a number of wavelengths which is greater than the number of color channels of the image sensor, in order to reconstruct the object with higher spectral resolution. In conventional approaches, in which only a single image is captured, this is not possible. The polychromatic MTF, which is the modulus of the Fourier transform of the polychromatic PSF defined in equation (17), can have small values. The frequencies at which a zero occurs cannot be reconstructed, as has already been explained.

The mentioned disadvantages of a reconstruction based on the multispectral PSF can be addressed at least in part by methods and apparatuses according to exemplary embodiments, in which the PSF, and accordingly the OTF, of the optical system is influenced for the capture of a plurality of single images. The plurality of single images can then be processed mathematically in dependence on the OTFs of the optical system.

A manipulation of the optical system can be implemented, for example, by a slight change of the focus. The acquired single images can be described mathematically as follows:

$$i_{l,j} = \Sigma_{k=1}^{K} \alpha_{k,l}(h_{k,j} * o_k). \quad (18)$$

where j is an index for the single image, $j=1, \ldots, J$, and J is the number of acquired single images. For example, J acquisitions of the object with J different focus positions can be made. With a different j, only the PSF changes, not the sensitivity of the individual color channels and not the object. The value $h_{k,j}$ correspondingly denotes the PSF at a light wavelength $\lambda_k$ and upon acquisition of the j-th single image. The sensitivity of the channels depends on the respective light wavelength, $\alpha_{k,l} = \alpha_l(\lambda_k)$. These values are dependent on the image sensor and are known. The acquisition of the single images takes place in such a manner that the object is thereby substantially unchangeable.

For the acquisition of the plurality of single images, at least one parameter of the optical system is changed, for example by defocusing. The change of the at least one parameter can be calculated in advance, in such a manner that a determination of $o_k$, that is to say a reconstruction of the object at light wavelength $\lambda_k$, can be implemented by a numerically robust optimization procedure.

The reconstruction of a spectrally resolved object can be performed, for example, by the following optimization problem:

$$\min \Sigma_{l=1}^{L} \Sigma_{j=1}^{J} \|i_{l,j} - \Sigma_{k=1}^{K} \alpha_{k,l}(h_{k,j} * o_k)\|^2, \qquad (19)$$

which is optimized according to $o_k$. It will be noted that, for each of the light wavelengths $\lambda_k$ for which a reconstruction is to be performed, $i_{l,j}$ and $o_k$ is not a scalar but contains the complete information of the two-dimensional image. If, for example—as is assumed for the following description—a vectorial representation is chosen, $i_{l,j}$ and $o_k$ are in each case a vector with a number of vector components which is equal to the number of pixels of the image sensor. For example, $i_{l,j}$ can be so represented that the pixel values in the lines of the image sensor captured in the color channel l upon capture of the j-th single image are introduced in succession into the vector $i_{l,j}$. A number of mathematically equivalent formulations can be used to set and solve the optimization procedure of equation (18). While the square of the L2 norm is used by way of example in equation (19) as the distance dimension for the target function to be minimised, any other distance dimension and in particular any metric can be used to determine a distance between the vector $i_{l,j}$, into which the measured single images enter, and the single image resulting mathematically for the corresponding $o_k$. For example, instead of the square of the L2 norm, any Lp norm, powers of Lp norms, Sobolev norms or other image quality evaluating measures, such as, for example, structural similarity (SSIM), can also be used.

In addition, a regularisation can be used when solving the optimization problem of equation (19). Technically improbable solutions, for example blurred edges in the reconstructed object and/or with abrupt wavelength-dependent changes in $o_k$, can thereby be suppressed. Methods of mathematical relaxation can be used to solve the optimization problem robustly.

As will be described in greater detail below, the optimization problem of equation (19) can be solved after transformation into the Fourier space. Convolution with the convolution operator * in equation (19) between wavelength-dependent PSF and object $o_k$ at the wavelength $\lambda_k$ then becomes a multiplication between the matrix and the vector. This permits the setting of criteria for the change of the at least one parameter which lead to a good condition, that is to say a high degree of robustness, of the optimization problem.

Figure 12:
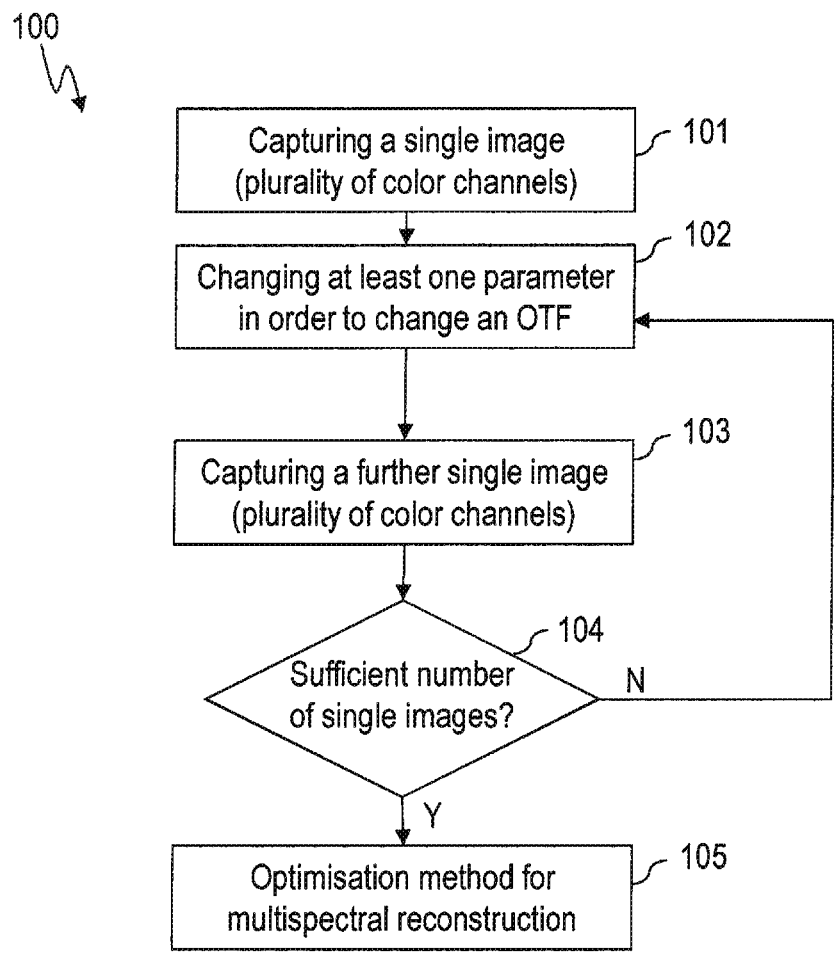
FIG. 12 is a flow diagram of a method according to a further exemplary embodiment.

FIG. 12 is a flow diagram of a method 100 according to an exemplary embodiment, in which a wavelength dependence of the OTF of the optical system is taken into consideration. The method can be carried out automatically by apparatuses as have been described with reference to FIGS. 1 and 2. The method can be used to compensate for a transverse chromatic aberration digitally. The method can be used to reconstruct an object multispectrally. The method can be used to compensate for wavelength-dependent optical aberrations. In the method, a plurality of single images are generally captured, at least one parameter of the optical system being changed. Reconstruction of an image, that is to say of the depicted object, takes place by automatic processing from the single images and the OTFs of the optical system upon image capture.

In step 101, a single image is captured. The image sensor can have a plurality of color channels in order to capture the single image $i_{l,1}$ in a plurality of color channels $l=1, \ldots, L$.

In step 102, at least one parameter of the optical system is changed. This can be performed in such a manner that the OTF is changed. The change can be performed in such a manner that the OTF is changed differently for different light wavelengths. The change of the at least one parameter can be performed in dependence on control information which has been calculated and stored in advance. This control information can be so determined that the optimization problem, according to which the reconstruction takes place, is as well-conditioned as possible.

In step 103, a further single image is captured. The image sensor can have a plurality of color channels in order to capture the single image $i_{l,2}$ in a plurality of color channels. The further single image captured in step 103 shows the same object as the single image captured in step 101. The further single image captured in step 103 can correspond to the same field of view as the single image captured in step 101.

In step 104 it is determined whether a sufficient number of single images has been captured. This determination can be performed in dependence on the number K of wavelengths for which the object is to be reconstructed, and the number L of color channels of the image sensor. The determination can be carried out in such a manner that $L \cdot J \geq K$. The determination can be performed in dependence on a time available for the acquisition of the plurality of single images. If it is determined in step 104 that a further single image is to be acquired, the method returns to step 102. Otherwise, the method continues with step 105.

In step 105, a digital reconstruction of the object takes place in dependence on the single images and the OTFs of the optical system during the respective image capture. These OTFs can be determined, as described with reference to FIGS. 1 to 11, by measurement and/or mathematical simulation. An incoherent, coherent or partially coherent optical model can be used as the basis. The OTF can be determined for the plurality of wavelengths $\lambda_k$ with $k=1, \ldots, K$ and used in the digital reconstruction. The digital reconstruction can be performed as described with reference to FIGS. 9 to 11. The digital reconstruction can also be performed by an optimization procedure based on equation (19), as will be explained in greater detail hereinbelow.

Reconstruction by optimization procedure;

An implementation of a spectrally resolved reconstruction with an optimization procedure is described in greater detail hereinbelow. This can be used in method 100 in step 105.

On the basis of equation (19), an optimization is carried out in which $$o_k \text{ for } k=1, \ldots, K \qquad (20)$$

is determined, that is to say the image of the object for light wavelengths $\lambda_k$.

For a more compact representation of the optimization problem of equation (19), a vector $o=(o_1; \ldots; o_K)$ and a vector $i=(i_{1;1}; \ldots; i_{1;J}; i_{2;1}; \ldots; i_{2;J}; \ldots; i_{L;1}; \ldots; i_{L;J})$ can be defined. It should be noted that each $o_k$ is not a scalar but the complete information of the two-dimensional image that is to be reconstructed. In the chosen vectorial notation, each $o_k$ has a number of components, which can correspond to the number of pixels of the image sensor. Accordingly, each $i_{l,j}$ is not a scalar but contains the information of the data determined for the j-th single image in the l-th color channel. In the chosen vectorial notation, each i has a number of components which can correspond to the number of pixels of the image sensor for the color channel l. O denotes a Fourier space representation corresponding to the vector o, the vector O containing the Fourier space data of the object for the different wavelengths $\lambda_k$. I denotes a Fourier space representation corresponding to the vector i, the vector I containing the Fourier space data of the J single images for the different color channels l.

With this notation, the optimization problem of equation (19), after transformation into the Fourier space, can be represented as a minimisation of $$\|\tilde{H}O - I\|^2, \quad (21)$$

where $\tilde{H} \in \mathbb{R}^{LJ \times K}$ is a system matrix in block representation. The vector I is known through the capture of the J single images in the L color channels. As has been explained in connection with equation (19), other metrics or similarity measures can also be used for the optimization.

The different blocks of the system matrix $\tilde{H}$ are defined as $$\tilde{H}_{(l-1) \times J + j, k} = \alpha_{k,l} H_{k,j}. \quad (22)$$

The Fourier transform of the PSF $h_{k,j}$ is the OTF $H_{k,j}$. The blocks of the system matrix are accordingly dependent both on the sensitivity of the color channels of the image sensor and on the OTF $H_{k,j}$ upon capture of the j-th single image and for the k-th wavelengths $\lambda_k$. It should be noted that on the right-hand side of equation (22), the OTF $H_{k,j}$ is itself again dependent on the spatial frequency f, so that this matrix defines the imaging between the (Fourier space) object vector for the light wavelengths $\lambda_k$ and the (Fourier space) image vector in the color channel l upon capture of the j-th single image.

The rows of the system matrix are defined for a given color channel l according to equation (22) as follows:

$$(\alpha_{1,l} H_{1,1}, \cdots, \alpha_{K,l} H_{K,1}), \quad (23)$$

$$(\alpha_{1,l} H_{1,2}, \cdots, \alpha_{K,l} H_{K,2}), \quad (24)$$

$$\cdots$$

$$(\alpha_{1,l} H_{1,J}, \cdots, \alpha_{K,l} H_{K,J}). \quad (25)$$

The optimization problem of equation (21) with the system matrix defined in equation (22), which corresponds to the problem of equation (19) after transformation into the Fourier space, can be solved by various techniques known per se to the person skilled in the art. For example, an interior point method or an active set strategy can be used.

The result of the optimization problem can be improved by suitable regularisations. All regularisation methods are possible here, as are expediently used in the literature for deconvolution problems. An example would be a Tikhonov regularisation. In addition or alternatively, it can be expedient, according to the application, to regularise the spectral dependence of the object. Typically, an object does not change abruptly with the wavelength. That is to say, a regularisation which ensures the smoothness of o in dependence on $\lambda$ and thus penalises jumps in o as a function of the light wavelength $\lambda$ can be used. The optimization problem can also be regularised, alternatively or in addition, with corresponding noise models.

Choice of the change of the at least one parameter for acquisition of the single images:

In order to reduce information loss owing to the fact that the MIT of the optical system exhibits a zero, the change of the at least one parameter in step 102 can be so chosen that, for each of the K light wavelengths $\lambda_k$ and at each spatial frequency j, at least one of the J OTFs $H_{k,j}(f)$ is other than zero at the corresponding spatial frequency. The change of the at least one parameter in step 102 can be so chosen that, for each of the K wavelengths $\lambda_k$ and at each spatial frequency f, at least one of the J OTFs $H_{k,j}(f)$ has a value whose modulus is greater than a specified threshold value. The change of the at least one parameter in step 102 can be so chosen that, for each of the K light wavelengths $\lambda_k$ and at each spatial frequency f in the relevant frequency range, the value $\max_j \{|H_{k,j}(f)|\}$ is as great as possible. Each of the criteria described with reference to FIG. 8 can be used here, for example.

When the image is reconstructed from the single images by an optimization procedure, the changes of at least one parameter of the optical system used in method 100 in step 102 can be so chosen that the optimization problem has a well-defined solution. This is precisely the case when the matrix $\tilde{H}$ is well-conditioned. A possible optimization criterion for the change of the at least one parameter for capture of the plurality of single images, for example the aberration change, can therefore be, for example, the condition of the matrix $\tilde{H}$. The rows of this matrix can be represented as indicated in equations (23) to (25).

The change of the at least one parameter for acquisition of the single images can accordingly be so chosen that the optimization problem is a well-posed problem and leads robustly to a solution. This can be achieved, for example, by the following criteria:

For each wavelength k and for each frequency, at least one $H_{k,j}$ is to have a high contrast. Otherwise, a column with zeros (or small values very close to zero) would form and accordingly lead to a small condition of the matrix. This can be taken into consideration with the above-described considerations, according to which, for each spatial frequency, at least one $H_{k,j}$ is to have as great a modulus as possible.

Figure 13:
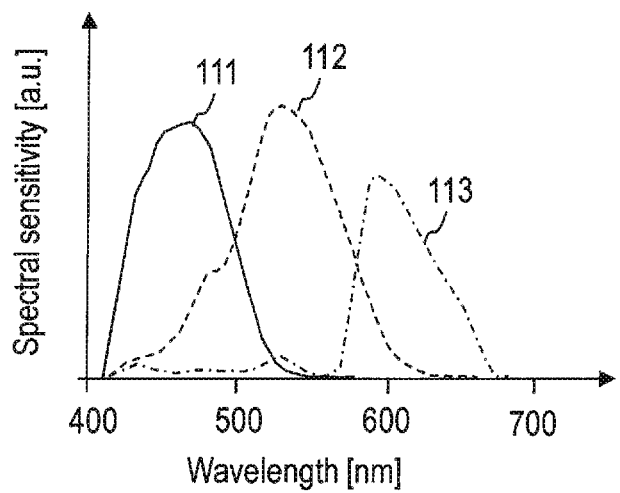
FIG. 13 illustrates spectral sensitivities of color channels of an image sensor, which can be taken into consideration in the method of FIG. 12.

In addition, the rows of matrix $\tilde{H}$ are to be as linearly independent as possible, so that the matrix has a good condition and the optimization problem is well-defined. The rows for different color channels l are typically linearly independent, because the sensitivities $\{(\alpha_{1,l}, \ldots, \alpha_{K,l})\}_{l=1, \ldots, L}$ for the individual color channels are very different. This is shown in FIG. 13, which shows the sensitivities 111-113 of an image sensor as a function of the light wavelength for different color channels. Accordingly, the requirement that the matrix $\tilde{H}$ is well-conditioned can correspondingly be broken down to the effect that the submatrices corresponding to a color channel l are as different as possible. In summary, the optimization problem of equations (21) and (22) is accordingly well-posed when the PSFs $\{h_{k,j}\}_{j=1; \ldots; J}$ are as varied as possible, that is to say when the associated OTFs $\{H_{k,j}\}_{j=1; \ldots, J}$ are correspondingly different.

This criterion of a good condition of the matrix $\tilde{H}$ can be taken into consideration if changes of at least one parameter of the optical system are calculated in advance. Corresponding control information can be stored and used in the apparatus for image capture. When the optical system has several settings, for example several zoom settings, the criterion of a good condition of the matrix $\tilde{H}$ can be evaluated separately for each of several zoom settings.

The change of the PSFs does not have to be in the form of differently high contrasts of the associated MTF but can also be effected by manipulation of the phase of the corresponding OTF, that is to say by a phase shift.

Choice of the number J of acquisitions of single images and/or the number K of discretisation stages for the determination in step 104 of method 100:

When a multispectral reconstruction for K wavelengths is to be performed, K is to be chosen according to the desired spectral resolution. If it is desired to take into consideration the wavelength dependence of the PSF, K is to be chosen in dependence on the change of the PSF. The greater the spectral dependence of the PSF, the greater K is to be chosen.

The number of single images J will then be so chosen that $J \cdot L \geq K$. This ensures that the optimization problem has a sufficient number of equations for determining all unknowns. However, this is not necessarily required if a correspondingly good regularisation is used. With increasing J, the total acquisition time increases, which is very limited in particular in the case of dynamic objects. As a result, there can be a limitation of the number J of single images and accordingly the number K of resolvable wavelengths.

If the $\{o_k\}$ for $k=1, \ldots, K$ are reconstructed by the method according to an exemplary embodiment, wavelength-resolved information about the object is available. The object is reconstructed multispectrally. This can be helpful for many applications. The number K can be greater than the number L of color channels of the image sensor. The conventional L color channels can also be reconstructed again according to $$o_l = \Sigma_{k=1}^{K} \alpha_{k,l} o_k. \qquad (26)$$

In methods according to exemplary embodiments, a deconvolution takes place not with the polychromatic PSF but, in a spectrally dependent manner, with the monochromatic PSF for the respective light wavelengths $\lambda_k$. The convolution kernel used is more suited for the respective wavelength than the polychromatic PSF. The influence of wavelength-dependent changes of the PSF on the image quality can be reduced. In particular, a better quality of the image produced can be achieved even when the PSF changes its form and position in dependence on the wavelength. This permits greater freedom for the design of the optical system and accordingly makes it possible, for example, to construct systems using inexpensive components but with a comparable performance.

In addition, in the case of methods according to exemplary embodiments it is possible to avoid problems which can occur with conventional approaches when the polychromatic MTF, that is to say the absolute value of the Fourier transform of the polychromatic PSF defined in equation (17), exhibits one or more zeros. By acquiring a plurality of single images in such a manner that the maximum $\{H_{k,j}(f)\}_{j=1; \ldots; J}$ has a large value for all spatial frequencies, such problems can be avoided.

The different OTFs which are present in the case of at least two acquisitions of single images can be achieved, for example, by different pupil aberrations. It is sufficient if one phase of the OTF changes between the acquisition of single images. The optical aberrations for the optical system must be known. These can be the result, for example, of simple lenses or manufacturing deviations. The pupil aberrations can be detected, for example, by simulations of the lenses or by measurement technology. The aberrations are determined in a spectrally resolved manner. The optical system has a plurality of channels with different spectral sensitivities.

Determination of the spectrally resolved optical aberrations of the lens by simulation or measurement and optionally calculation of a suitable aberration change can be performed for a specific optical system in advance. The corresponding control information for the image capture and information about the OTFs for the evaluation can be stored for use in the acquisition of the single images and the digital reconstruction. In further forms, the change of the at least one parameter can be implemented without prior calculation.

After multiple rapid or simultaneous color image acquisition of the single images with the corresponding aberration changes, the spectrally resolved object $\{o_k\}_{k=1; \ldots; K}$ can be determined, that is to say the image can be reconstructed from the single images, by solving an optimization problem, as has been described with reference to equations (19) to (22). If color channel images are desired, the color channel image can be calculated according to the sensitivities of the color channel, for example using equation (26).

With apparatuses and methods according to exemplary embodiments in which the OTF is purposively manipulated for the capture of a plurality of single images and an image fusion then takes place for digital reconstruction in dependence on the OTFs, several effects can be achieved. The object can be reconstructed multispectrally. The spectral resolution can be higher than the number of color channels. Cost advantages can be achieved in comparison with high-quality lenses, because it does not have to be ensured that the PSF is relatively constant over the sensitivity range of a color channel. In addition, more pronounced transverse chromatic aberrations can be allowed, because they can be corrected digitally by this method. By acquiring a plurality of single images with purposive aberration changes it is possible with simple components, for example by defocusing by shifting the image sensor, to deconvolve even those aberrations which cannot be compensated for or can be compensated for to only a limited degree with conventional approaches. The compensation of transverse chromatic aberrations in particular brings advantages. In the apparatuses and methods, demands for a minimum contrast in one of the J single images are made of the monochromatic MTF. This is easier to achieve in practice than conditions relating to the polychromatic MTF.

With reference to FIGS. 1 to 13, methods and apparatuses have been described in which, for the acquisition of a plurality of single images, a defocusing, for example, is purposively controlled in order to be able to reconstruct an image of good quality. Many further modifications can be used.

In an optical system which is not rotationally symmetrical about the optical axis, for example, a purposive rotation of the MTF about the optical axis can be effected. As a result, spatial frequencies can be detected in the acquisition of a second single image that are lost in the noise upon acquisition of a first single image because the values of the MTF are too small.

Figure 14:
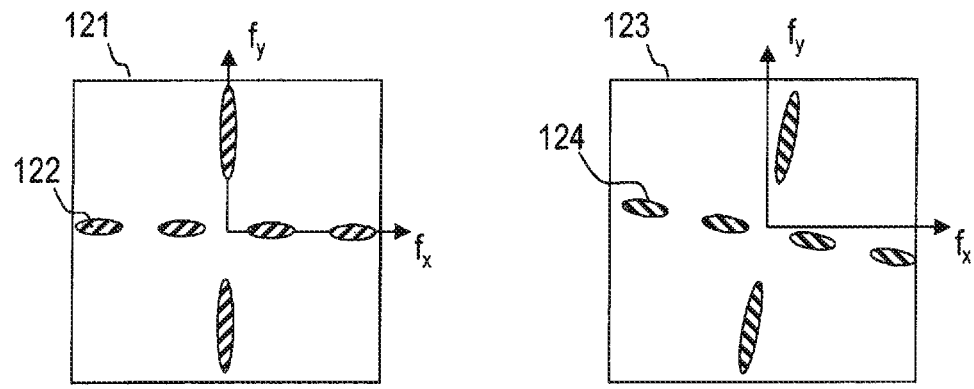
FIG. 14 illustrates a purposive manipulation of an optical system in methods and apparatuses according to exemplary embodiments, in which a modulation transfer function is rotated in two dimensions.

FIG. 14 shows an exemplary representation 121 of spatial frequencies upon acquisition of a first single image. In hatched regions 122, the MTF upon acquisition of the first single image is smaller than a threshold value. By purposive rotation of the MTF about the optical axis, these regions with small MTF can be shifted upon acquisition of the second single image to other spatial frequencies, as shown by way of example in the representation 123. The regions 124 in which the MTF is smaller than the threshold value are shifted relative to the regions 122.

If the PSF is locally changeable, an effective change of the MTF can also be achieved by causing a relative shift between a component of the optical system and the object. This can be implemented, for example, by controlling a deflecting mirror with which the object is reproduced in other regions of the image sensor.

Figure 15:
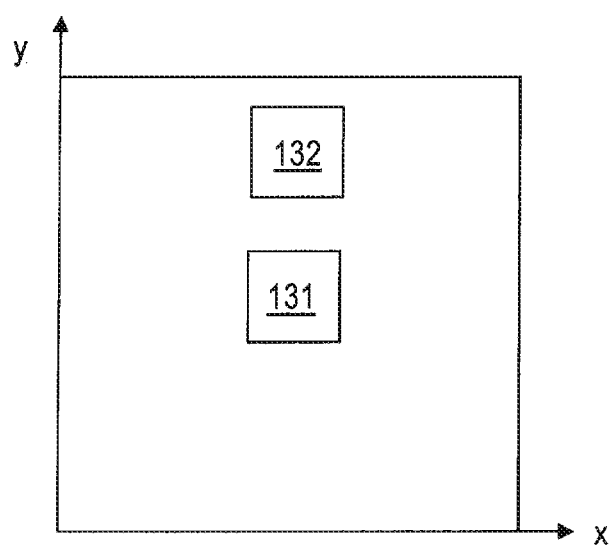
FIG. 15 illustrates a purposive manipulation of an optical system in methods and apparatuses according to exemplary embodiments, in which spatial changes of the point spread function are utilised.

FIG. 15 shows an exemplary representation of a surface of an image sensor. A PSF for an image on a first region 131 of the image sensor can differ from a PSF for an image on a second region 132 of the image sensor that is offset relative thereto. By reproducing the same object in the first region 131 in a first picture and in the second region 132 in the second picture, an effective change in the MTF can be brought about. This can be used for the digital reconstruction in dependence on the MTFs for the first region 131 and the second region 132.

While exemplary embodiments have been described in detail with reference to the figures, modifications can be made in further exemplary embodiments.

Methods and apparatuses according to exemplary embodiments, as have been described with reference to FIGS. 1 to 15, can further be configured to recognise when the object has changed between the two acquisitions. In this case, a reconstruction can be performed, for example, from only a single image, in order to avoid falsifications. Alternatively or in addition, an image registration of the single images relative to one another can be carried out, in order to reduce artefacts resulting from the movement of the object. Methods and apparatuses according to exemplary embodiments can further be configured to measure a movement of the system if movement artefacts are to be compensated for.

Methods as have been described with reference to FIG. 1 to 15 can also be taken into consideration in the design of the optical system. An optical system can purposively be so configured that zeros of the MTF can readily be compensated for by a change of a parameter and subsequent digital reconstruction. The high quality of the image reconstructed from a plurality of single images can be used as an objective functional in the lens design in the sense that a configuration of the optical system is determined in which the zeros of the MTF can readily be compensated for.

While methods and apparatuses have been described in which single images are captured time-sequentially and a parameter of the optical system is changed between the acquisition of the single images, the single images can also be captured simultaneously. The change of the at least one parameter of the optical system is thereby adjusted between the two sections of the optical system with which the different single images are captured.

Methods and apparatuses according to exemplary embodiments are not only suitable for use in wavelengths in the visible part of the optical spectrum, but can also be used in the infrared and ultraviolet part of the optical spectrum.

Apparatuses and methods according to exemplary embodiments can be used in optical systems which have relatively simple lenses, for example in cameras in mobile communication devices or other portable devices. Apparatuses and methods can, however, also be used in special applications, for example in microscopy or industrial measurement technology, for increasing quality by the processing of a plurality of single images.

The invention claimed is:

1. A method for image reconstruction, comprising:
   determining a number of single images to be captured depending on a strength of wavelength-dependent aberration changes of an optical system;
   capturing a plurality of single images according to the determined number using the optical system, wherein at least one parameter of the optical system is different upon capture of at least two single images; and
   digitally reconstructing, by a processing device, an image in dependence on the plurality of single images and in dependence on information about optical transfer functions of the optical system upon capture of the plurality of single images;
   wherein a first single image is captured with a first optical transfer function and a second single image is captured with a second optical transfer function, the second optical transfer function being different from the first optical transfer function;
   the image being reconstructed in dependence on information about the first optical transfer function and information about the second optical transfer function; and
   wherein capturing the plurality of single images comprises:
   changing the at least one parameter upon capture of the single images in dependence on at least one of:
      spatial frequencies at which a first modulation transfer function, which is a modulus of the first optical transfer function, is smaller than a threshold value; or
   spatial frequencies at which a second modulation transfer function, which is a modulus of the second optical transfer function, is smaller than the threshold value.

2. The method according to claim 1,
wherein the at least one parameter is changed automatically upon capture of the single images in dependence on at least one of the first optical transfer function or the second optical transfer function.

3. The method according to claim 2,
wherein changing the at least one parameter includes changing an aberration of the optical system.

4. The method according to claim 1,
wherein changing the at least one parameter comprises:
   determining a change in the at least one parameter which causes the second modulation transfer function to be greater than the threshold value at those spatial frequencies at which the first modulation transfer function is smaller than the threshold value.

5. The method according to claim 1,
wherein the image is reconstructed in dependence on spatial frequencies at which the first modulation transfer function is greater than the second modulation transfer function.

6. The method according to claim 1, wherein changing the at least one parameter comprises:
   determining a change of the at least one parameter which causes at least one of the first modulation transfer function and the second modulation transfer function to be greater than the threshold value at each spatial frequency up to the diffraction limit.

7. The method according to claim 1,
wherein the first optical transfer function exhibits a phase shift relative to the second optical transfer function.

8. The method according to claim 1,
wherein the image is reconstructed as a function of a wavelength dependence of the first optical transfer function and a wavelength dependence of the second optical transfer function.

9. The method according to claim 8,
wherein the optical system comprises an image sensor having a plurality of color channels, and wherein the image is reconstructed in dependence on a wavelength dependence of a sensitivity of the image sensor for each one of the plurality of color channels.

10. The method according to claim 8, wherein a multispectral reconstruction of the image is performed.

11. The method according to claim 10, wherein a number of single images which are captured is determined automatically in dependence on a number of wavelengths for which the image is reconstructed.

12. The method according to claim 1, wherein a control device detects a setting of the optical system upon capture of a first single image, determines a change of the at least one parameter in dependence on the recognised setting using a table, and controls the optical system in such a manner that a second single image is captured with the changed at least one parameter, so that an optical transfer function of the optical system upon capture of the second single image is different from an optical transfer function upon capture of the first single image.

13. The method according to claim 1, wherein changing comprises one or more of the following measures:
setting a pupil of the optical system;
setting a defocus;
polarisation-coded manipulation;
setting of a Jones pupil;
setting of a longitudinal chromatic aberration or a transverse chromatic aberration;
setting of a spatial light modulation;
setting of a shift of spatial frequencies of an object captured in the plurality of single images by lighting;
setting of a two-dimensional orientation of the first and second optical transfer functions;
setting of an imaging scale; and
setting of a pixel size of an image sensor.

14. An apparatus for image reconstruction, comprising:
an optical system;
a control device for controlling the optical system, which control device is configured to determine a number of single images to be captured depending on a strength of a wavelength-dependent aberration changes of the optical system and to control the optical system, for the capture of a plurality of single images corresponding to the determined number, in such a manner that at least one parameter of the optical system is different upon capture of at least two single images, in order to capture a first single image with a first optical transfer function and to capture a second single image with a second optical transfer function which is different from the first optical transfer function; and
a processing device for digitally reconstructing an image in dependence on the plurality of single images and in dependence on information about the first optical transfer function of the optical system upon capture of the first single image and information about the second optical transfer function of the optical system upon capture of the second single image;
wherein the control device is configured to set a change of the at least one parameter upon capture of the single images in dependence on at least one of:
spatial frequencies at which a first modulation transfer function, which is a modulus of the first optical transfer function, is smaller than a threshold value; or
spatial frequencies at which a second modulation transfer function, which is a modulus of the second optical transfer function, is smaller than the threshold value.

15. The apparatus according to claim 14, wherein the control device is configured to control the capture of the plurality of single images in dependence on a gradient of the first modulation transfer function or of the second modulation transfer function.

16. The method according to claim 1, wherein determining the number of single images to be captured depending on the strength of wavelength-dependent aberration changes of the optical system comprises determining the number based on how pronounced are the aberration changes with the wavelength.

17. The apparatus according to claim 14,
wherein the optical system comprises an image sensor having a plurality of color channels; and
wherein the processing device is configured to reconstruct the image as a function of a wavelength dependence of a sensitivity of the image sensor and at least one of:
a wavelength dependence of the first optical transfer function; or
a wavelength dependence of the second optical transfer function.

18. The apparatus according to claim 14,
wherein the processing device is configured to compute a weighted superposition of the first single image and the second single image in Fourier space; and
wherein at least one weighting factor of the weighted superposition is spatially varying in dependence on the first modulation transfer function and the second modulation transfer function.

19. The apparatus according to claim 14, wherein the control device is configured to control at least one of:
a pupil of the optical system;
a defocus;
polarisation-coding;
a Jones pupil;
a longitudinal chromatic aberration or a transverse chromatic aberration;
a spatial light modulation;
a shift of spatial frequencies of an object captured in the plurality of single images by lighting;
a two-dimensional orientation of the first and second optical transfer functions;
an imaging scale; and
a pixel size of an image sensor.

20. The method according to claim 10, wherein the multispectral reconstruction comprises:
determining the reconstructed image for a number of wavelengths which is greater in number than the plurality of color channels of the image sensor.

* * * * *